(12) United States Patent
Sumitani et al.

(10) Patent No.: US 12,395,764 B2
(45) Date of Patent: Aug. 19, 2025

(54) SOLID-STATE IMAGING DEVICE WITH REDUNDANT AD CONVERSION CIRCUITS AND SELECTIVE EXCLUSION

(71) Applicant: Nuvoton Technology Corporation Japan, Kyoto (JP)

(72) Inventors: Norihiko Sumitani, Osaka (JP); Hiroshi Fujinaka, Osaka (JP); Yutaka Abe, Osaka (JP); Takayasu Kito, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 136 days.

(21) Appl. No.: 18/526,611

(22) Filed: Dec. 1, 2023

(65) Prior Publication Data

US 2024/0163579 A1  May 16, 2024

Related U.S. Application Data

(63) Continuation of application No. PCT/JP2022/019635, filed on May 9, 2022.

(30) Foreign Application Priority Data

Jun. 7, 2021 (JP) .................... 2021-095194

(51) Int. Cl.
*H04N 25/78* (2023.01)
*H04N 25/68* (2023.01)
*H04N 25/771* (2023.01)

(52) U.S. Cl.
CPC ............. *H04N 25/78* (2023.01); *H04N 25/68* (2023.01); *H04N 25/771* (2023.01)

(58) Field of Classification Search
CPC ........ H04N 25/78; H04N 25/68; H04N 25/69; H04N 25/771
See application file for complete search history.

(56) References Cited

U.S. PATENT DOCUMENTS 8,040,414 B2  10/2011  Nakao et al.
8,830,334 B2 *  9/2014  Silsby ................... H04N 25/68
                                                    348/335

(Continued)

FOREIGN PATENT DOCUMENTS

JP   2009-213012 A   9/2009
JP   2012-060334 A   3/2012

(Continued)

OTHER PUBLICATIONS

Extended European Search Report dated Aug. 1, 2024 issued in the corresponding European Patent Application No. 22819974.1.

(Continued)

*Primary Examiner* — Nicholas G Giles
(74) *Attorney, Agent, or Firm* — Rimon P.C.

(57) ABSTRACT

A solid-state imaging device includes: a plurality of pixel circuits arranged in rows and columns; a plurality of selector circuits that each receive, as inputs, two pixel signals corresponding to two columns different from each other; k column AD conversion circuits that perform AD conversion on pixel signals output from the plurality of selector circuits, k being an integer greater than or equal to two; and m column AD conversion circuits that are provided redundantly. In the solid-state imaging device, the plurality of selector circuits selectively exclude, from among the k column AD conversion circuits and the m column AD conversion circuits, m column AD conversion circuits corresponding to m columns adjacent to each other, and associate k pixel signals output from the plurality of pixel circuits with k column AD conversion circuits which have not been excluded.

10 Claims, 20 Drawing Sheets

(56) References Cited

U.S. PATENT DOCUMENTS

| | | | |
|---|---|---|---|
| 9,380,240 B2* | 6/2016 | Yamaoka | H04N 25/78 |
| 2012/0133794 A1* | 5/2012 | Silsby | H04N 21/434 |
| | | | 348/E5.024 |
| 2013/0161488 A1 | 6/2013 | Doi | |
| 2015/0271429 A1* | 9/2015 | Yamaoka | H04N 25/68 |
| | | | 348/301 |
| 2019/0110010 A1 | 4/2019 | Yamamoto | |
| 2020/0412992 A1 | 12/2020 | Kobayashi et al. | |
| 2022/0094874 A1 | 3/2022 | Asakura | |

FOREIGN PATENT DOCUMENTS

| | | |
|---|---|---|
| JP | 2015-185860 A | 10/2015 |
| JP | 2017-184075 A | 10/2017 |
| JP | 2020-123795 A | 8/2020 |
| JP | 2021-005794 A | 1/2021 |

OTHER PUBLICATIONS

International Search Report dated Jul. 26, 2022 issued in International Patent Application No. PCT/JP2022/019635, with English translation.

* cited by examiner

FIG. 6

| Settings | SEL1 | SEL2 | SEL3 | SEL4 | P1 | P2 | P3 | P4 | P5 | P6 | P7 | P8 | P9 | P10 | P11 | P12 |
|---|---|---|---|---|---|---|---|---|---|---|---|---|---|---|---|---|
| Setting 1 | H | H | H | H | CADC 1 | CADC 2 | CADC 3 | CADC 4 | CADC 5 | CADC 6 | CADC 7 | CADC 8 | CADC 9 | CADC 10 | CADC 11 | CADC 12 |
| Setting 2 | L | L | L | L | CADC 5 | CADC 6 | CADC 7 | CADC 8 | CADC 9 | CADC 10 | CADC 11 | CADC 12 | CADC 13 | CADC 14 | CADC 15 | CADC 16 |
| Setting 3 | H | L | L | L | CADC 1 | CADC 2 | CADC 3 | CADC 4 | CADC 9 | CADC 10 | CADC 11 | CADC 12 | CADC 13 | CADC 14 | CADC 15 | CADC 16 |
| Setting 4 | H | H | L | L | CADC 1 | CADC 2 | CADC 3 | CADC 4 | CADC 5 | CADC 6 | CADC 7 | CADC 8 | CADC 13 | CADC 14 | CADC 15 | CADC 16 |

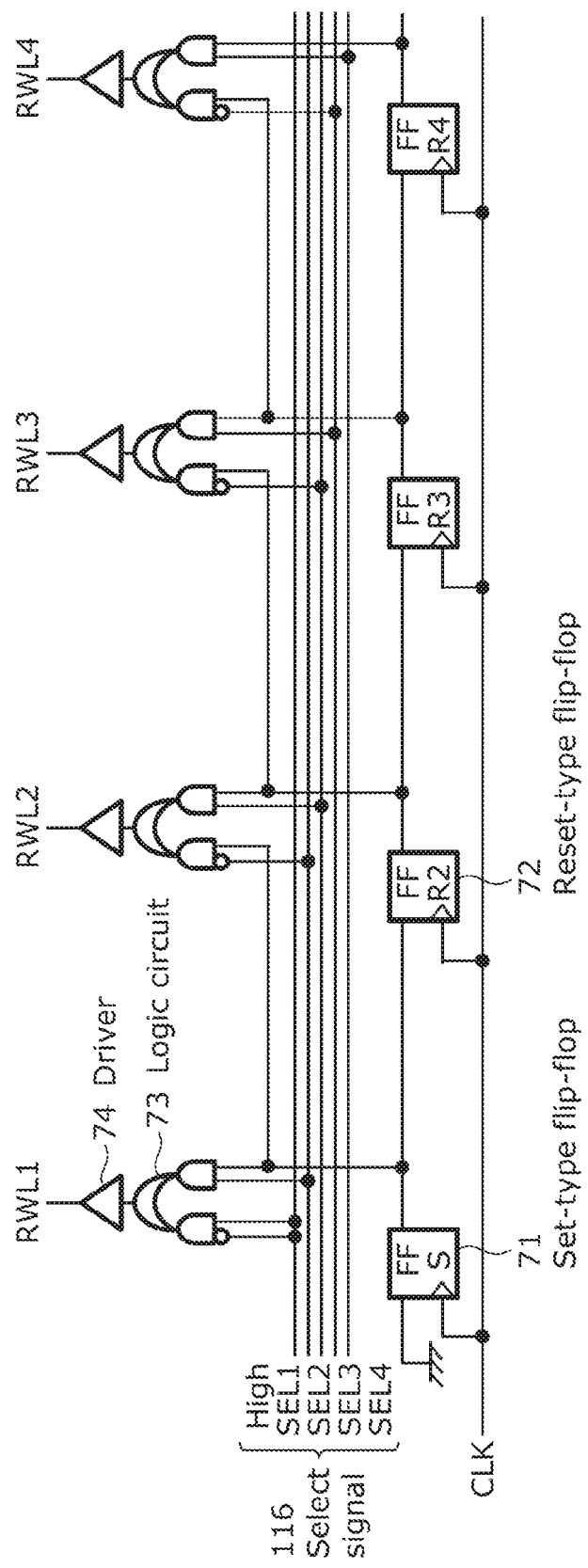

FIG. 12

| Settings | SEL1 | SEL2 | SEL3 | SEL4 | Readout cycle 1 | | | | Readout cycle 2 | | | | Readout cycle 3 | | | |
|---|---|---|---|---|---|---|---|---|---|---|---|---|---|---|---|---|
| Setting 1 | H | H | H | H | CADC 1 | CADC 2 | CADC 3 | CADC 4 | CADC 5 | CADC 6 | CADC 7 | CADC 8 | CADC 9 | CADC 10 | CADC 11 | CADC 12 |
| Setting 2 | L | L | L | L | CADC 5 | CADC 6 | CADC 7 | CADC 8 | CADC 9 | CADC 10 | CADC 11 | CADC 12 | CADC 13 | CADC 14 | CADC 15 | CADC 16 |
| Setting 3 | H | L | L | L | CADC 1 | CADC 2 | CADC 3 | CADC 4 | CADC 9 | CADC 10 | CADC 11 | CADC 12 | CADC 13 | CADC 14 | CADC 15 | CADC 16 |
| Setting 4 | H | H | L | L | CADC 1 | CADC 2 | CADC 3 | CADC 4 | CADC 5 | CADC 6 | CADC 7 | CADC 8 | CADC 13 | CADC 14 | CADC 15 | CADC 16 |

FIG. 18

| Settings | FF0 | FF1 | FF2 | FF3 | FF4 | P1 | P2 | P3 | P4 | P5 | P6 | P7 | P8 | P9 | P10 | P11 | P12 |
|---|---|---|---|---|---|---|---|---|---|---|---|---|---|---|---|---|---|
| Setting 1 | H | H | H | H | H | CADC 1 | CADC 2 | CADC 3 | CADC 4 | CADC 5 | CADC 6 | CADC 7 | CADC 8 | CADC 9 | CADC 10 | CADC 11 | CADC 12 |
| Setting 2 | H | L | L | L | L | CADC 5 | CADC 6 | CADC 7 | CADC 8 | CADC 9 | CADC 10 | CADC 11 | CADC 12 | CADC 13 | CADC 14 | CADC 15 | CADC 16 |
| Setting 3 | H | H | L | L | L | CADC 1 | CADC 2 | CADC 3 | CADC 4 | CADC 9 | CADC 10 | CADC 11 | CADC 12 | CADC 13 | CADC 14 | CADC 15 | CADC 16 |
| Setting 4 | H | H | H | L | L | CADC 1 | CADC 2 | CADC 3 | CADC 4 | CADC 5 | CADC 6 | CADC 7 | CADC 8 | CADC 13 | CADC 14 | CADC 15 | CADC 16 |

SOLID-STATE IMAGING DEVICE WITH REDUNDANT AD CONVERSION CIRCUITS AND SELECTIVE EXCLUSION

CROSS REFERENCE TO RELATED APPLICATIONS

This is a continuation application of PCT International Application No. PCT/JP2022/019635 filed on May 9, 2022, designating the United States of America, which is based on and claims priority of Japanese Patent Application No. 2021-095194 filed on Jun. 7, 2021. The entire disclosures of the above-identified applications, including the specifications, drawings and claims are incorporated herein by reference in their entirety.

FIELD

The present disclosure relates to a solid-state imaging device.

BACKGROUND

In solid-state imaging devices, column AD conversion circuits for performing AD conversion, column by column, on pixel signals output from pixels are widely used. In recent years, solid-state imaging devices are provided with more pixels and becoming faster, and a total number of the above-described column AD conversion circuits mounted in solid-state imaging devices has been increasing year by year. With an increase in the total number of column AD conversion circuits mounted, the probability of open/short defects in wiring sections and transistor formation defects increases. In the case of a failure of a unit pixel cell, the failure is a flaw failure by which only one pixel is affected, and when a total number of flaws is small, the image quality degradation caused by correction processing is minor and can be addressed by correction. It is thus possible in many cases to ship the product as a non-defective product. On the other hand, defects occurring in the column AD conversion circuit result in image quality anomalies of line defects that are difficult to correct, and thus when a defect occurs in even one column AD conversion circuit, the solid-state imaging device as a whole is treated as defective.

For that reason, in recent years, the manufacturing cost of solid-state imaging devices has been increasing due to the decrease in yield caused by column AD conversion circuits. In view of the above, a solid-state imaging device provided with a redundancy relief circuit in each column AD conversion circuit unit has been proposed to inhibit a decrease in yield caused by the increase in the total number of column AD conversion circuits (see, for example, Patent Literature (PTL) 1 and PTL 2).

CITATION LIST

Patent Literature

PTL 1: Japanese Unexamined Patent Application Publication No. 2015-185860
PTL 2: Japanese Unexamined Patent Application Publication No. 2009-213012

SUMMARY

Technical Problem

However, with the conventional techniques disclosed in PTL 1 and PTL 2, it is not possible to perform redundancy relief in the case of the occurrence of a defect of column AD conversion circuits across a plurality of columns, which has been increasing due to recent miniaturization.

In addition, in PTL 1, the length of the vertical signal line differs for each pixel column, resulting in image quality degradation due to the variation of each column.

By the way, a solid-state imaging device using a column AD conversion circuit generally transfers, in the horizontal direction via a digital memory, a value converted to a digital value (AD value) by the column AD conversion circuit.

For example, the upper limit of operating frequency for the readout speed of a digital memory is determined by transistor capacity, wiring resistance, and capacitance, and some solid-state imaging devices improve throughput by reading out AD values of a plurality of columns in parallel so as to achieve high-speed readout.

For example, it is common to read out memory corresponding to a plurality of columns (e.g., four columns) simultaneously, and read out memory corresponding to a plurality of other columns in another cycle.

For example, in such a case, the layout of the digital memory section has a repeating structure of a plurality of columns, and thus even a minute difference in a current distribution can result in a repeating structure of units of a plurality of columns.

A minute current distribution is a causal factor of noise during pixel readout. However, it is possible to relatively easily reduce the noise by performing correction processing at regular intervals in the case of periodic noise. On the other hand, the cycle of repetition is disordered in the redundancy relief as disclosed in PTL 1 and PTL 2. It is difficult to perform periodic correction processing on noise generated in such a circuit configuration, and such noise affects an image quality.

In view of the above-described problem, the present disclosure provides a solid-state imaging device capable of relieving defective column AD circuits (ADCs) across a plurality of columns.

Solution to Problem

In order to solve the above described problem, a solid-state imaging device according to an aspect of the present disclosure includes: a plurality of pixel circuits arranged in rows and columns; a plurality of selectors that each receive, as inputs, two pixel signals corresponding to two columns different from each other; k column AD conversion circuits that perform AD conversion on pixel signals output from the plurality of selectors, k being an integer greater than or equal to two; and m column AD conversion circuits that are provided redundantly. In this solid-state imaging device, the plurality of selectors selectively exclude, from among the k column AD conversion circuits and the m column AD conversion circuits, m column AD conversion circuits corresponding to m columns adjacent to each other, and associate k pixel signals output from the plurality of pixel circuits with k column AD conversion circuits which have not been excluded.

Advantageous Effects

With the solid-state imaging device according to the present disclosure, it is possible to relieve defective column ADCs across a plurality of columns.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 is an explanatory diagram illustrating an example of the connection settings of the pixel signal lines and the column AD conversion circuits corresponding to P1 through P12, controlled by select signals, according to Embodiment 1.

FIG. 7 is a diagram illustrating an example of the configuration of the horizontal scanning circuit according to Embodiment 1.

FIG. 12 is an explanatory diagram illustrating the correspondence between readout cycles and the columns of each of the column AD conversion circuits corresponding to data output from the data transfer circuit, according to Embodiment 2.

FIG. 18 is an explanatory diagram illustrating the connection settings of the pixel signal lines and the column AD conversion circuits corresponding to P1 through P12, controlled by select signals, according to Embodiment 4.

DESCRIPTION OF EMBODIMENTS

Hereinafter, embodiments of the present disclosure will be described with reference to the drawings. It should be noted that each of the exemplary embodiments described below shows one specific example of present disclosure.

The numerical values, shapes, materials, structural components, the arrangement and connection of the structural components, steps, the processing order of the steps etc. described in the following embodiments are mere examples, and therefore do not limit the scope of the present disclosure. In addition, among the structural components in the following embodiments, structural components not recited in any one of the independent claims are described as arbitrary structural elements.

Embodiment 1

Figure 1:
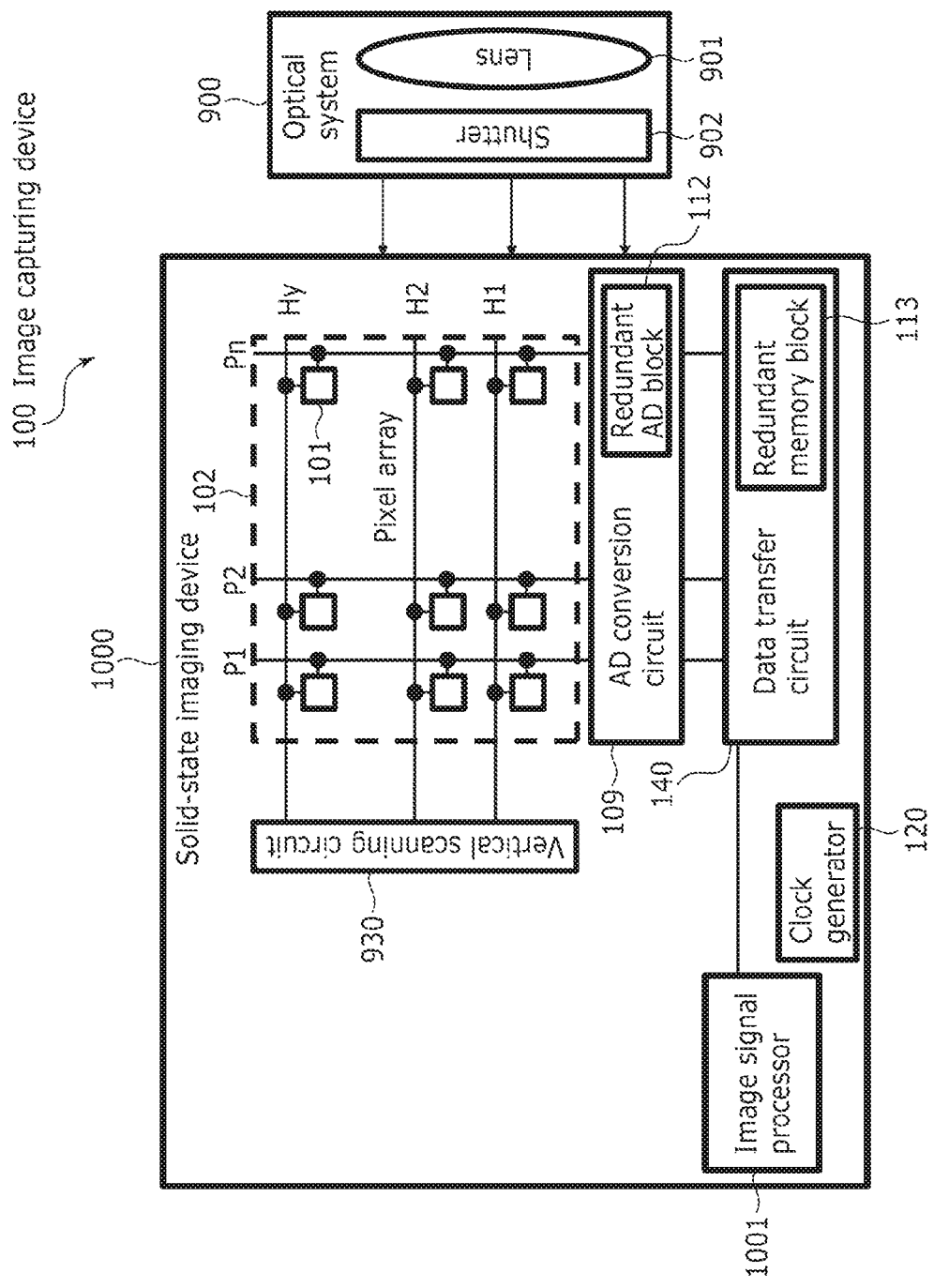
FIG. 1 is a block diagram illustrating an example of the configuration of an image capturing device according to Embodiment 1.

FIG. 1 is a block diagram illustrating an example of the configuration of image capturing device 100 according to Embodiment 1. As illustrated in FIG. 1, image capturing device 100 is a camera or a camera module, for example, and includes optical system 900 and solid-state imaging device 1000.

Optical system 900 includes lens 901 and mechanical shutter 902. Lens 901 focuses light (e.g., visible light) from an object to form an image on pixel array 102 of solid-state imaging device 1000. Mechanical shutter 902 is located in an optical path between lens 901 and solid-state imaging device 1000, and controls an amount of light guided onto pixel array 102.

Solid-state imaging device 1000 includes pixel array 102, vertical scanning circuit 930, AD conversion circuit 109, data transfer circuit 140, clock generator 120, and image signal processor 1001.

Image signal processor 1001 carries out various types of signal processing (image processing) on digital output data OUTPUT which has been output by data transfer circuit 140.

Vertical scanning circuit 930 scans a plurality of pixel circuits 101, on a row-by-row basis, to read out signals from pixel circuits 101 on a row-by-row basis.

Pixel array 102 includes the plurality of pixel circuits 101 arranged in rows and columns. Here, pixel circuit 101 includes a light receiver including a photoelectric conversion element that carries out photoelectric conversion. The photoelectric conversion element is, for example, a light-sensitive element such as a photodiode or a photogate, a photoelectric conversion film including amorphous silicon, or an organic photoelectric conversion film. Pixel circuit 101 further includes a device for reading out a signal produced through photoelectric conversion and a device for carrying out an initialization operation, as necessary.

Clock generator 120 generates clock signals (reference clock signals) and supplies clock signals different from each other respectively to: binary counter 104 and column AD conversion circuit 106 included in AD conversion circuit 109; data transfer circuit 140; and vertical scanning circuit 930.

AD conversion circuit 109 includes redundant AD block 112, and data transfer circuit 140 includes redundant memory block 113.

Figure 2:
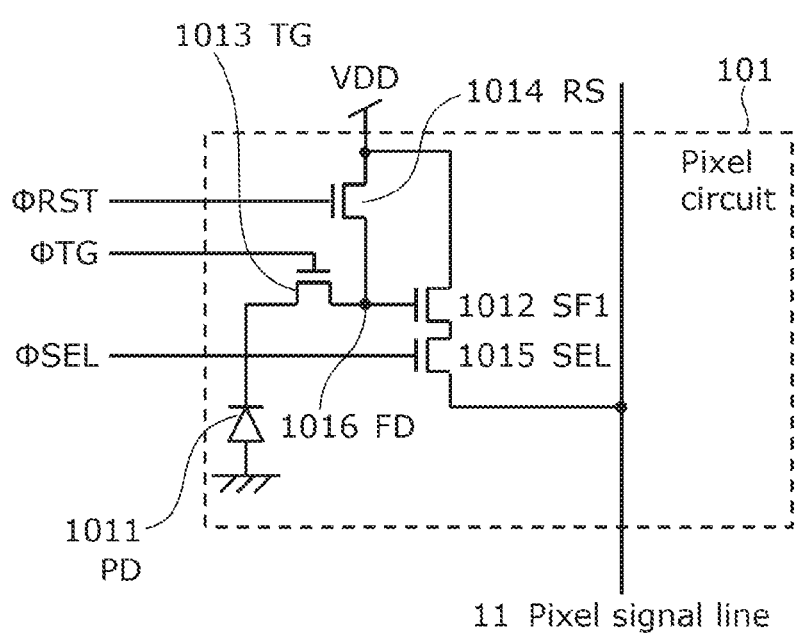
FIG. 2 is a diagram illustrating a detailed configuration example of a pixel circuit according to Embodiment 1.

FIG. 2 is a diagram illustrating a detailed configuration example of pixel circuit 101 according to Embodiment 1.

Pixel circuit 101 includes light receiver (pixel, photodiode, photoelectric conversion element) 1011, amplification transistor 1012 that outputs an amplification signal according to the amount of signal charge, transfer transistor 1013 that transfers the signal charge photoelectrically converted by light receiver 1011, reset transistor 1014, selection transistor 1015, and a floating diffusion section (FD section) 1016. Selection transistor 1015 causes pixel signal line 11 and amplification transistor 1012 to be in a conducting state according to driving pulse signal SEL, only when pixel circuit 101 corresponds to a read row. Reset transistor 1014 resets FD section 1016 to the initial voltage by driving pulse signal RS. Transfer transistor 1013 transfers the signal accumulated by light receiver 1011 to FD section 1016, by driving pulse signal TG. The signal transferred to FD section 1016 is output as a voltage to the pixel signal line through selection transistor 1015 by amplification transistor 1012 including a drain connected to a power supply and current supply 111, and is input to column AD circuit 4. Driving pulse signals SEL, TG, and RS illustrated in FIG. 2 are the details of the signal lines indicated by horizontal control line Hy in FIG. 1.

Here, the configuration in which pixel circuit 101 includes a single light receiver 1011 has been described, but pixel circuit 101 may have a plurality of light receivers 1011.

Figure 3:
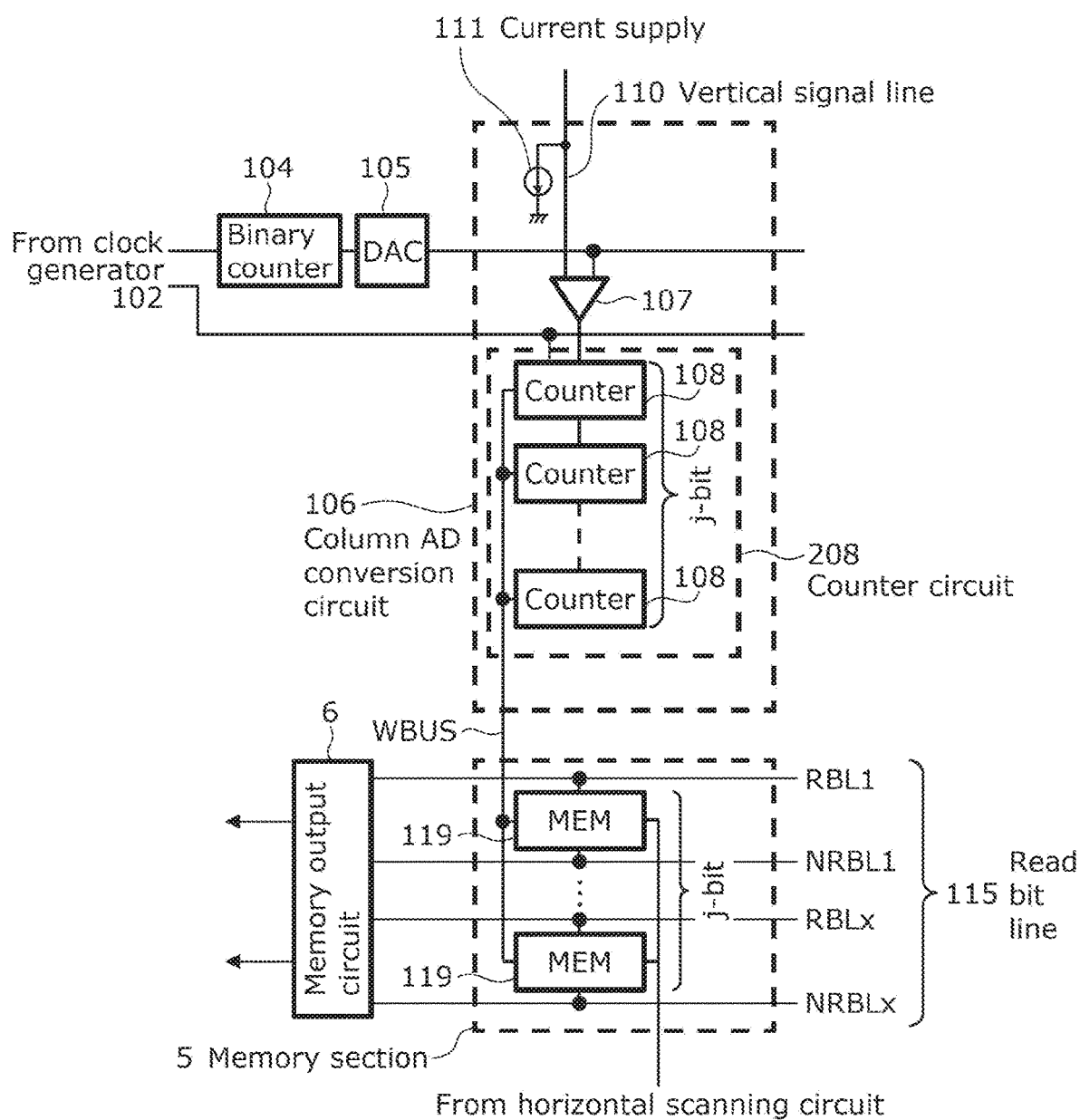
FIG. 3 is a diagram illustrating a configuration example of a column AD conversion circuit and a memory section according to Embodiment 1.

FIG. 3 is a diagram illustrating a configuration example of a column AD conversion circuit and a memory section according to Embodiment 1. In the diagram, the example of the configuration of column AD conversion circuit 106 included in AD conversion circuit 109 and memory section 5 included in data transfer circuit 140 in a single column unit is illustrated.

Column AD conversion circuit 106 is connected to binary counter 104 and DA conversion circuit (hereinafter abbreviated as DAC) 105.

Each column AD conversion circuit 106 includes comparator 107 and counter circuit 208.

Each column AD conversion circuit 106 has a function of converting an analog signal to a j-bit digital signal, and column AD conversion circuit 106 includes j-bit counter circuit 208.

Counter circuit 208 includes a total of j 1-bit counters 108 to form a j-bit counter.

DAC 105 generates an analog ramp voltage (triangular wave) according to the binary value input from binary counter 104. This analog ramp voltage is input to comparator 107 in column AD conversion circuit 106.

Current supply 111 is connected to vertical signal line 110, and comparator 107 compares the analog ramp voltage generated by DAC 105 with an electric potential of vertical signal line 110.

Binary counter 104 and counter circuit 208 are supplied with a clock from clock generator 120.

Memory section 5 consists of j-bit memory 119. The memory section is connected to a memory output circuit via read bit lines RBL and NRBL.

Memory section 5 is connected to counter circuit 208 via write bus line WBUS, temporarily stores counter values from counter circuit 208 for j bits, and the stored counter values are output via memory output circuit 6. Write bus line WBUS, for example, is a 1-bit bus that transmits serial data.

Figure 4:
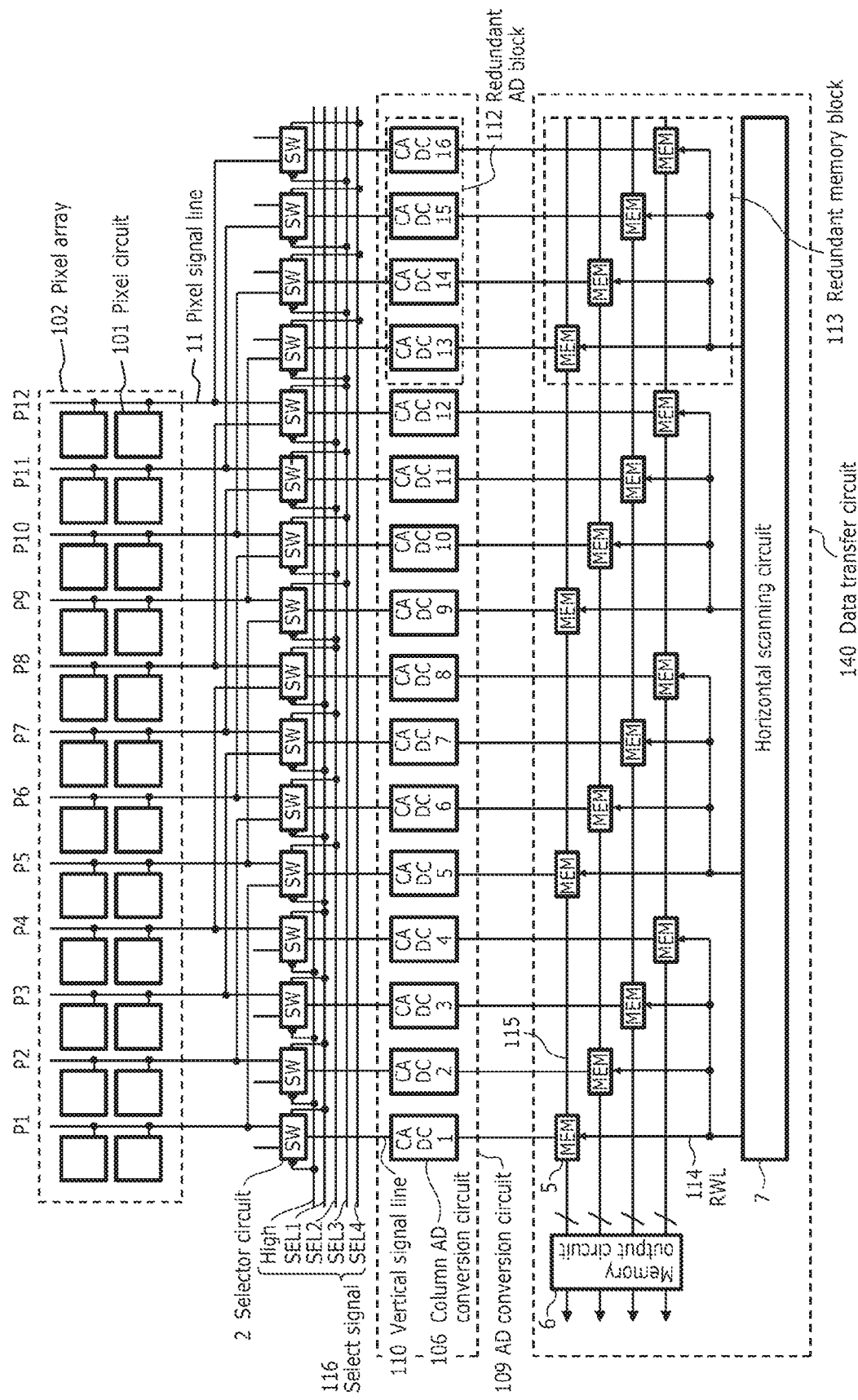
FIG. 4 is a diagram illustrating a configuration example of an AD conversion circuit including a redundant AD block, a data transfer circuit including a redundant memory block, a pixel array, and a selector circuit, according to Embodiment 1.

FIG. 4 is a diagram illustrating a configuration example of AD conversion circuit 109 including redundant AD block 112, data transfer circuit 140 including redundant memory block 113, pixel array 102, and selector circuit 2, according to Embodiment 1.

Here, the total number of pixel columns (the total number of pixels in the horizontal direction) k is 12 for simplification of the diagram, and pixel signal lines 11 connected to pixel circuits 101 are respectively described as P1 to P12. In addition, in FIG. 4, DAC 105 and binary counter 104 illustrated in FIG. 3 are omitted.

Memory section 5 in data transfer circuit 140 includes as many memories 119 per column as bit counts j of the counter connected to memory section 5.

Memory section 5 has a configuration in which read bit lines RBL/NRBL are shared by every plural columns (every m columns), and memory sections 5 are read out simultaneously for a plurality of columns (m columns). In this working example, m is 4 and the data of memory sections 5 corresponding to four column AD conversion circuits are read out simultaneously.

AD conversion circuit 109 includes a total of k column AD conversion circuits 106 that perform AD conversion on the pixel signals output from selector circuit 2, and a total of m column AD conversion circuits 106 that are provided redundantly. As described above, AD conversion circuit 109 includes redundant AD block 112 including the m column AD conversion circuits 106. In addition, data transfer circuit 140 also includes redundant memory block 113 including a total of m memory sections 5 provided redundantly. FIG. 4 illustrates an example in which m is 4.

In other words, AD conversion circuit 109 has a configuration in which a total of k+m column AD conversion circuits 106 including column AD conversion circuits 106 in redundant AD block 112 are included. Similarly, data transfer circuit 140 has a configuration in which a total of k+m memory sections 5 including memory sections 5 in redundant memory block 113 are included.

Horizontal scanning circuit 7 performs the operation of reading out data to read bit lines 115 by sequentially activating readout signal lines RWL 114 of memory sections 5 for every m columns with redundant memory block 113 being also included.

Selector circuits 2 are arranged as a total of (k+m) selector circuits 2, each receive, as inputs, pixel signals of the nth pixel (n=1 . . . k) and the n+mth pixel, and are connected to a total of (n+m) column AD conversion circuits 106. The connection state of each of selector circuits 2 is controlled by select signals 116 (SEL 1, SEL 2, SEL 3, and SEL 4). With this control, when column AD conversion circuit 106 that is defective is present among column AD conversion circuits 106, the (k+m) selector circuits 2 selectively excludes the m column AD conversion circuits corresponding to the m columns adjacent to each other from the (k+m) column AD conversion circuits, and associates k pixel signals output from the plurality of pixel circuits 101 with the k column AD conversion circuits which have not been excluded. Here, in the m column AD conversion circuits 106 that are selectively excluded, column AD conversion circuit 106 that is defective is included.

The (k+m) selector circuits 2 are divided into three groups. The first group includes a total of m selector circuits 2 corresponding to the first to mth columns (P1 to P4 in FIG. 4). The second group includes a total of (k−m) selector circuits 2 corresponding to the (m+1)th to kth columns (P5 to P12 in FIG. 4). The third group includes a total of m selector circuits 2 corresponding to the (k+1)th to (k+m)th columns. Here, the first column corresponds to P1 among pixel signal lines 11 illustrated in FIG. 4.

Each of the (k−m) selector circuits 2 of the second group receives, as inputs, the pixel signal corresponding to the nth column (n is an integer from m+1 to k) and the pixel signal corresponding to the (n+m)th column, and selectively outputs one of the two pixel signals that have been received to a corresponding one of column AD conversion circuits 106.

Each of the m selector circuits 2 of the first group receives, as inputs, a signal indicating a fixed value and the pixel signal corresponding to the n1th column (n1 is an integer from 1 to m), and selectively outputs one of the two pixel signals that have been received to a corresponding one of column AD conversion circuits 106.

Each of the m selector circuits 2 of the third group receives, as inputs, the pixel signal corresponding to the n2th column (n2 is an integer from (k+1) to (k+m)) and a signal indicating a fixed value, and selectively outputs one of the two pixel signals that have been received to a corresponding one of column AD conversion circuits 106. Here, the fixed value may be any voltage value within the range that the pixel signal can take, and may be, for example, a reset level.

With the configuration as described above, the (k+m) selector circuits 2 shifts some or all of the k pixel signals from the first to kth by m columns in a column alignment direction, thereby selectively excluding the m column AD conversion circuits corresponding to the shifted m columns, and associating the some or all of the k pixel signals with the k column AD conversion circuits that have not been excluded.

Figure 5:
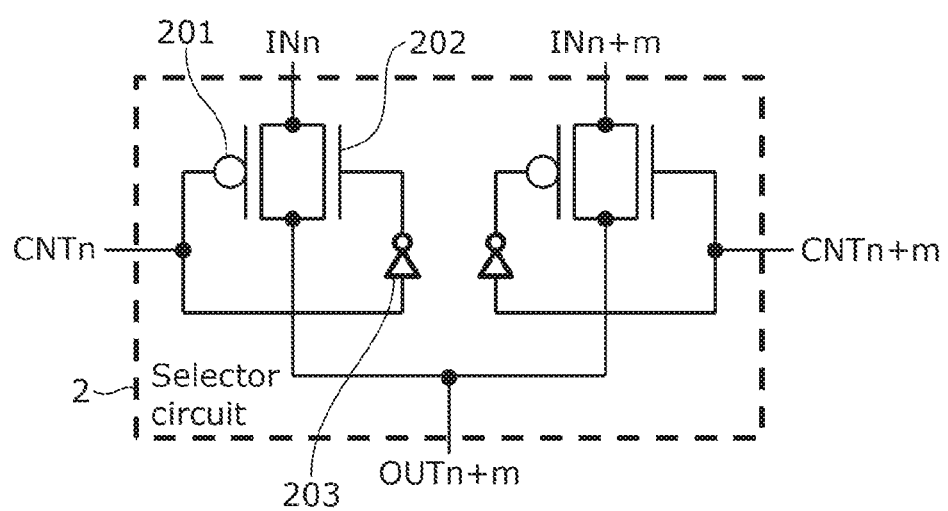
FIG. 5 is a diagram illustrating an example of the circuit configuration of the selector circuit according to Embodiment 1.

FIG. 5 is a diagram illustrating a circuit configuration example of selector circuit 2 according to Embodiment 1. Selector circuit 2 includes P-channel MOS transistor 201, N-channel MOS transistor 202, and inverter 203.

INn is an input terminal connected to the nth pixel and INn+m is an input terminal connected to the n+mth pixel. Selector circuit 2 is controlled with control signal CNTn and control signal CNTn+m to switch between three states; that is, the state in which INn and output terminal OUTn+m are connected to conduct, the state in which INn+m and OUTn+m are conducted, and the state in which (i) INn and OUTn+m and (ii) INn+m and OUTn+m are both in a non-conducting state.

For example, INn+m and OUTn+m are in a conducting state when electric potential H (high) is input to CNTn and electric potential H is input to CNTn+m; INn and OUTn+m are in a conducting state when electric potential L (low) is input to CNTn and electric potential L is input to CNTn+m; and (i) INn and OUTn+m and (ii) INn+m and OUTn+m are both in the non-conducting state when electric potential H is input to CNTn and electric potential L is input to CNTn+m.

It should be noted that a fixed value is input to input terminal INn of each of the m selector circuits 2 corresponding to the first column to the mth column. In addition, a fixed value is input to input terminal INn+m of each of the m selector circuits 2 corresponding to the (k+1)th column to the (k+m)th columns.

FIG. 6 is an explanatory diagram indicating the connection settings of pixel signal lines 11 and column AD conversion circuits 106 corresponding to P1 through P12, controlled by select signals 116 according to Embodiment 1.

Setting 1 indicates the state in which P1 is connected to column AD conversion circuit 106 denoted as CADC 1, and similarly, column AD conversion circuits 106 denoted as CADC 2 to CADC 12 are connected to pixel signal lines 11 corresponding to P2 to P12, respectively. At this time, in all of selector circuits 2, INn+m and OUTn+m are in a conducting state. At this time, the input of redundant AD block 112 is not in conduction with the pixel signal line.

Setting 2 is a setting that assumes the case where a failure has occurred in one or more of column AD conversion circuits 106 denoted as CADC 1 to CADC 4, or a failure has occurred in one or more memory sections 5 connected to the one or more of column AD conversion circuits 106 denoted as CADC 1 to CADC 4. At this time, in selector circuits 2 connected to column AD conversion circuits 106 denoted as CADC 1 to CADC 4, both of INn and INn+m are in a non-conducting state with OUTn+m. In addition, since INn and OUTn+m are in a conducting state in selector circuits 2 connected to column AD conversion circuits 106 denoted as CADC 5 to CADC 16, pixel signal lines 11 denoted as P1 to P12 are connected to column AD conversion circuits 106 denoted as CADC 5 to CADC 16 including redundant AD block 112. As a result, it is possible to read out all of pixel circuits 101 without using column AD conversion circuits 106 denoted as CADC 1 to CADC 4 and memory sections 5 connected to column AD conversion circuits 106 denoted as CADC 1 to CADC 4.

Setting 3 is a setting that assumes the case where a failure has occurred in one or more of column AD conversion circuits 106 denoted as CADC 5 to CADC 8, or a failure has occurred in one or more memory sections 5 connected to the one or more of column AD conversion circuits 106 denoted as CADC 5 to CADC 8. At this time, in selector circuits 2 connected to column AD conversion circuits 106 denoted as CADC 5 to CADC 8, both of INn and INn+m are in a non-conducting state with OUTn+m. In addition, since INn+m and OUTn+m are in a conducting state in selector circuits 2 connected to column AD conversion circuits 106 denoted as CADC 1 to CADC 4, and INn and OUTn+m are in a conducting state in selector circuits 2 connected to column AD conversion circuits 106 denoted as CADC 9 to CADC 16, pixel signal lines 11 denoted as P1 to P12 are connected to column AD conversion circuits 106 denoted as CADC 1 to CADC 3 and CADC 9 to CADC 16 including redundant AD block 112. As a result, it is possible to read out all of pixel circuits 101 without using column AD conversion circuits 106 denoted as CADC 5 to CADC 8 and memory sections 5 connected to column AD conversion circuits 106 denoted as CADC 5 to CADC 8.

Setting 4 is a setting that assumes the case where a failure has occurred in one or more of column AD conversion circuits 106 denoted as CADC 9 to CADC 12, or a failure has occurred in one or more memory sections 5 connected to the one or more of column AD conversion circuits 106 denoted as CADC 9 to CADC 12. At this time, in selector circuits 2 connected to column AD conversion circuits 106 denoted as CADC 9 to CADC 12, both of INn and INn+m are in a non-conducting state with OUTn+m. In addition, since INn+m and OUTn+m are in a conducting state in selector circuits 2 connected to column AD conversion circuits 106 denoted as CADC 1 to CADC 8, and INn and OUTn+m are in a conducting state in selector circuits 2 connected to column AD conversion circuits 106 denoted as CADC 13 to CADC 16, pixel signal lines 11 denoted as P1 to P12 are connected to column AD conversion circuits 106 denoted as CADC 1 to CADC 3 and CADC 9 to CADC 16 including redundant AD block 112. As a result, it is possible to read out all of pixel circuits 101 without using column AD conversion circuits 106 denoted as CADC 9 to CADC 12 and memory sections 5 connected to column AD conversion circuits 106 denoted as CADC 9 to CADC 12.

It should be noted that, although the means of detecting a failure in column AD conversion circuit 106 and memory section 5 for each column is omitted, it can be easily detected by conducting a test using a built-in self-test (BIST) circuit or the like during chip testing. On the basis of the test results, the electric potentials of select signals SEL are fixed according to the state of the chip failure, thereby allowing the defective chip to be shipped as a good product.

FIG. 7 is a diagram illustrating a configuration example of horizontal scanning circuit 7 according to Embodiment 1.

Horizontal scanning circuit 7 is a circuit for activating readout signal line RWL 114 of the memory section, and includes set-type flip-flop 71 and a reset-type flip-flop 72 with logic circuit 73. Set-type flip-flop 71 and reset-type flip-flop 72 take in data through a data input at the rising of clock CLK and output the data taken in, and the data output is held until the next clock CLK.

The data input of set-type flip-flop 71 is connected to a ground level, and the data output is connected to the data input of reset-type flip-flop 72. Hereafter, horizontal scanning circuit 7 has a shift register configuration in which the data output of reset-type flip-flop 72 is connected to the data input of adjacent reset-type flip-flop 72.

Logic circuit 73 which outputs readout signal RWL 1 of the memory section via driver 74 receives as inputs the data output of set-type flip-flop 71, select signal SEL 1, and fixed signal High. In other words, readout signal RWL 1 of the memory section is activated to level H only when SEL 1 is at level H and set-type flip-flop 71 is at level H.

Logic circuit 73 that outputs readout signal RWL 2 of the memory section via driver 74 outputs the logical OR of the logic product of the data output of reset-type flip-flop 72 denoted as FFR 2 and select signal SEL 2 and the logic product of the data output of set-type flip-flop 71 and the inverted signal of SEL 1. At this time, when SEL 1 is L, RWL 2 is activated according to the data output of set-type flip-flop 71, and when SEL 2 is H, RWL 2 is activated according to the data output of reset-type flip-flop 72 denoted as FFR 2.

Logic circuit 73 that outputs readout signal RWL 3 of the memory section via driver 74 outputs the logical OR of the logic product of the data output of reset-type flip-flop 72 denoted as FFR 3 and select signal SEL 3 and the logic product of the data output of reset-type flip-flop 72 denoted as FFR 2 and the inverted signal of SEL 2. At this time, when SEL 2 is L, RWL 3 is activated according to the data output of reset-type flip-flop 72 denoted as FFR 2, and when SEL 3 is H, RWL 3 is activated according to the data output of reset-type flip-flop 72 denoted as FFR 3.

Logic circuit 73 that outputs readout signal RWL 4 of the memory section via driver 74 outputs the logical OR of the logic product of the data output of reset-type flip-flop 72 denoted as FFR 4 and select signal SEL 4 and the logic product of the data output of reset-type flip-flop denoted as FFR 3 and the inverted signal of SEL 3. At this time, when SEL 3 is L, RWL 4 is activated according to the data output of reset-type flip-flop 72 denoted as FFR 3, and when SEL 4 is H, RWL 4 is activated according to the data output of reset-type flip-flop 72 denoted as FFR 4.

FIG. 8A to FIG. 8D illustrate drive waveforms of readout signals RWL 1 to RWL 4 supplied to the memory section according to Embodiment 1. FIG. 8A to FIG. 8D illustrates the transition state of readout signals RWL 1 to RWL 4 supplied to the memory section according to an input of clock CLK and the setting state of each of select signals SEL 1 to SEL 4. It should be noted that these settings are the same as the settings illustrated in FIG. 6. FIG. 8A to FIG. 8D illustrate the drive waveforms of readout signals RWL 1 to RWL 4 supplied to the memory section for the respective settings 1 to 4.

Figure 8A:
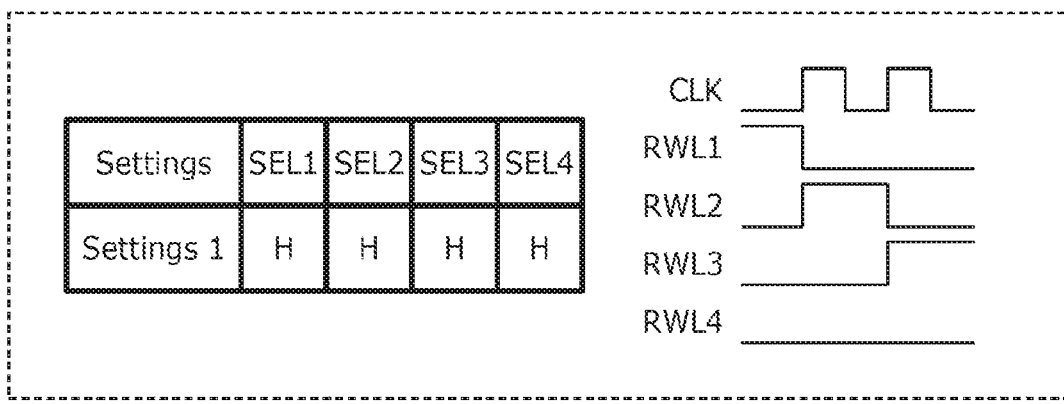
FIG. 8A is a diagram illustrating the drive waveforms of readout signals RWL 1 to RWL 4 supplied to the memory section corresponding to setting 1 according to Embodiment 1.

Setting 1 indicated in FIG. 8A is the state in which SEL 1 through SEL 4 are all H. In this case, the initial state of RWL 1 is H and RWL 2 and RWL 3 are activated sequentially with the transition of clock CLK.

Figure 8B:
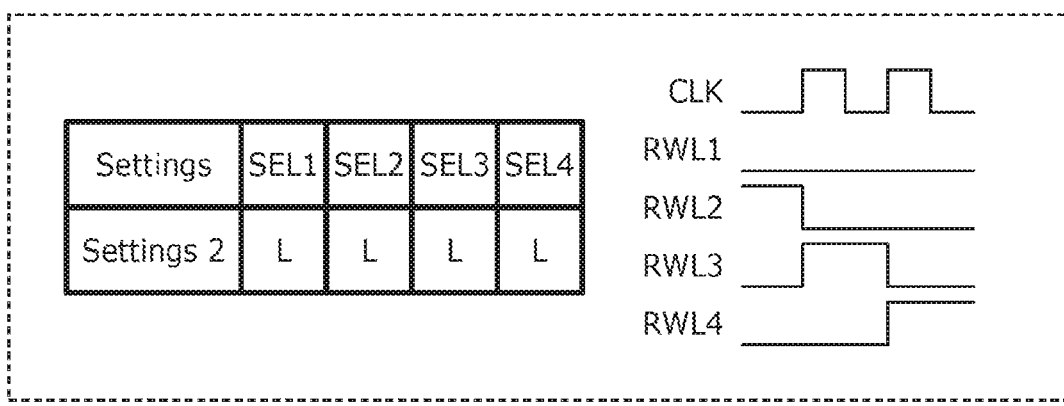
FIG. 8B is a diagram illustrating the drive waveforms of readout signals RWL 1 to RWL 4 supplied to the memory section corresponding to setting 2 according to Embodiment 1.

Setting 2 indicated in FIG. 8B is the state in which SEL 1 through SEL 4 are all L. In this case, the initial state of RWL 2 is H and RWL 3 and RWL 4 are activated sequentially with the transition of clock CLK.

Figure 8C:
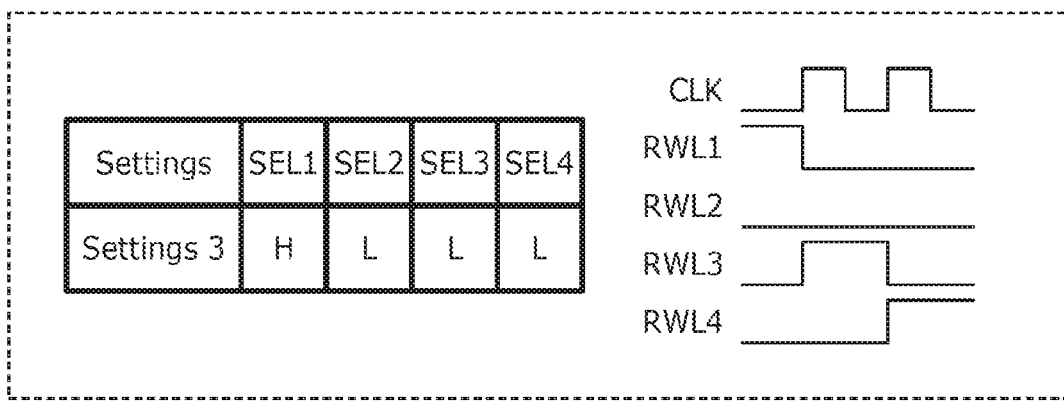
FIG. 8C is a diagram illustrating the drive waveforms of readout signals RWL 1 to RWL 4 supplied to the memory section corresponding to setting 3 according to Embodiment 1.

Setting 3 indicated in FIG. 8C is the state in which SEL 1 is H and SEL 2 through SEL 4 are L. In this case, the initial state of RWL 1 is H and RWL 3 and RWL 4 are activated sequentially with the transition of clock CLK. in other words, the activation is carried out with RWL 2 being skipped.

Figure 8D:
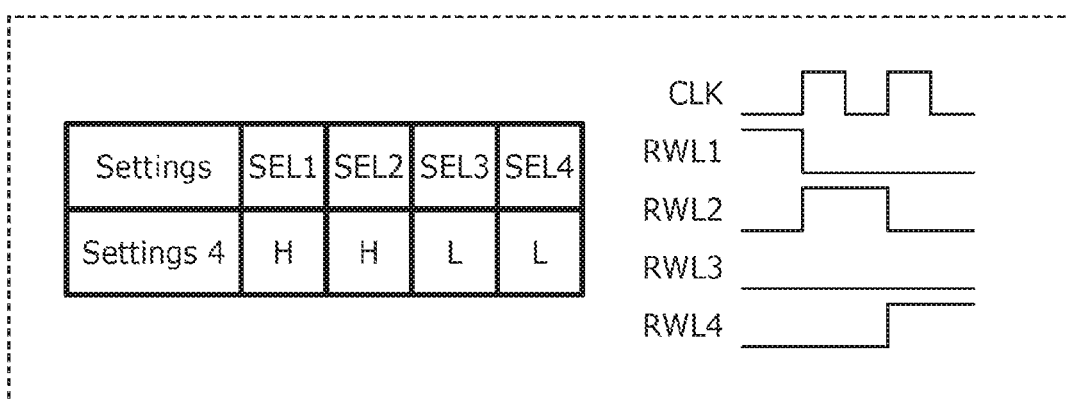
FIG. 8D is a diagram illustrating the drive waveforms of readout signals RWL 1 to RWL 4 supplied to the memory section corresponding to setting 4 according to Embodiment 1.

Setting 4 indicated in FIG. 8D is the state in which SEL 1 and SEL 2 are H and SEL 3 and SEL 4 are L. In this case, the initial state of RWL 1 is H and RWL 2 and RWL 4 are activated sequentially with the transition of clock CLK. in other words, the activation is carried out with RWL 3 being skipped.

As indicated in FIG. 8A to FIG. 8D, horizontal scanning circuit 7 excludes, from scanning, the m memories corresponding to the m column AD conversion circuits which include column AD conversion circuit 106 that is defective and have been excluded, out of the (k+m) memories, and scans the k memories corresponding to the k column AD conversion circuits that have not been excluded.

By controlling horizontal scanning circuit 7 as described above, the pixel data output from data transfer circuit 140 does not change in operation on appearance whether redundancy relief is performed or not, and image signal processor 1001 can be designed without changing operation depending on the presence or absence of a defect. The operation on appearance includes, for example, the order in which AD conversion values are read out, and the timing of the readout.

A defect may occur in a plurality of columns where column AD conversion circuits 106 are located adjacent to each other. A defects may also occur in a plurality of columns where memory sections 5 are located adjacent to each other.

Column AD conversion circuit 106 that is defective is detected, for example, at the factory in a pre-shipment inspection process of solid-state imaging device 1000, and is written as defect information in non-volatile memory to the host system of solid-state imaging device 1000.

As described above, by arranging redundant AD block 112 including column AD conversion circuits 106 for m columns where m is 2 or more and redundant memory block 113 including memory sections 5 for m columns, and connecting selector circuit 2 with the nth and n+mth columns of pixel signal lines 11, it is possible to relieve the defect of column AD conversion circuits 106 in units of m columns or relieve the defect of memory sections 5 in units of m columns. As a result, it is possible to improve yield by relieving a plurality of columns.

It should be noted that, in this working example, the control on selector circuit 2 by select signal 116 is only an example. The total number of combinations in the case of performing redundancy relief is n/m (n=12, m=4 in this working example), and it can be four states including three types of combination and non-redundancy. Since there is a finite number of combinations, it is possible to reduce the total number of select signal lines by, for example, placing a decoding circuit for each selector circuit 2.

It should be noted that, although this working example describes an example of performing redundancy relief for column AD conversion circuits 106 in units of m columns and for memory sections in units of m columns by arranging redundant AD block 112 and redundant memory block 113, redundant memory blocks for m columns may be arranged without providing a redundant AD conversion circuit, and redundancy relief may be performed for memory sections 5 in units of m columns. For example, when the failure rate of column AD conversion circuit 106 is extremely low and the failure rate of memory section 5 is high, providing redundant AD block 112 results in an increase in costs.

In this case, it is possible to perform redundancy relief for only memory section 5 by providing, between column AD conversion circuit 106 and memory section 5, the selector that has been provided between pixel array section 102 and column AD conversion circuit 106.

It should be noted that, data transfer circuit 140 outputs memory data for m columns (m=4 in FIG. 4) in parallel in the example described above, but the parallel number is not limited to m. The parallel number may be any number, for example, 2m, 4m, m/2, m/4, etc.

In addition, solid-state imaging device 1000 may be of a stacked-chip type in which a plurality of semiconductor chips are stacked. In this case, one of the plurality of semiconductor chips may be primarily provided with an analog circuit and another of the plurality of semiconductor chips may be primarily provided with a logic circuit.

In addition, solid-state imaging device 1000 may be of a back surface irradiation type (BSI type).

As described above, solid-state imaging device 1000 according to Embodiment 1 includes a plurality of pixel circuits arranged in rows and columns; a plurality of selector circuits 2 that each receive, as inputs, two pixel signals corresponding to two columns different from each other; k column AD conversion circuits that perform AD conversion on pixel signals output from the plurality of selectors, k being an integer greater than or equal to two; and m column AD conversion circuits that are provided redundantly. In solid-state imaging device 1000, the plurality of selector circuits 2 selectively exclude, from among the k column AD conversion circuits and the m column AD conversion circuits, m column AD conversion circuits corresponding to m columns adjacent to each other, and associate k pixel signals output from the plurality of pixel circuits with k column AD conversion circuits which have not been excluded.

According to the above-described configuration, it is possible to relieve column AD conversion circuits that are defective and are across a plurality of columns.

Here, the plurality of selector circuits 2 may shift some or all of the k pixel signals by m columns in a column alignment direction, to selectively exclude m column AD conversion circuits 106 corresponding to tm columns used for shifting.

According to the above-described configuration, it is possible to maintain the periodicity of characteristics resulting from the repeating structure of the circuits between the case where redundancy relief is carried out and the case where redundancy relief is not carried out.

Here, the plurality of selector circuits 2 may include at least (k−m) selectors, and each of the at least (k−m) selector circuits 2 may receive, as inputs, a first pixel signal corresponding to an nth column and a second pixel signal corresponding to an (n+m)th column, and selectively output one of the first pixel signal or the second pixel signal that have been received to a corresponding column AD conversion circuit 106 among the k column AD conversion circuits and the m column AD conversion circuits, n being an integer from m+1 to k.

According to the above-described configuration, it is possible to maintain the periodicity of characteristics resulting from the repeating structure of the circuits between the case where redundancy relief is carried out and the case where redundancy relief is not carried out.

Here, solid-state imaging device 1000 may further include: k memory sections 5 that store k AD conversion values output from the k column AD conversion circuits; m memory sections 5 that store m AD conversion values output from the m column AD conversion circuits, the m memory sections 5 being provided redundantly; and horizontal scanning circuit 7 that excludes, from scanning, m memory sections 5 corresponding to m column conversion circuits that have been excluded, from among k memory sections 5 and m memory sections 5, and scans k memory sections 5 corresponding to k column AD conversion circuits 106 that have not been excluded.

According to the above-described configuration, there is no change in, on appearance, the output operation (for example, the order of output and output timing) for AD conversion values that are output by horizontal scanning between the case where redundancy relief is carried out and the case where redundancy relief is not carried out, and it is not necessary to change, depending on the presence or absence of a defect, the operation of the circuit that receives and processes the AD conversion values.

Here, the horizontal scanning circuit may cause the m memories to output m AD conversion values by performing scanning in a unit of m memories.

According to the above-described configuration, even when the redundancy relief is performed, the periodic correction process for periodic noise is not disturbed because the periodicity of the repetition of the circuits involved in the generation of periodic noise can be maintained.

Embodiment 2

Figure 9:
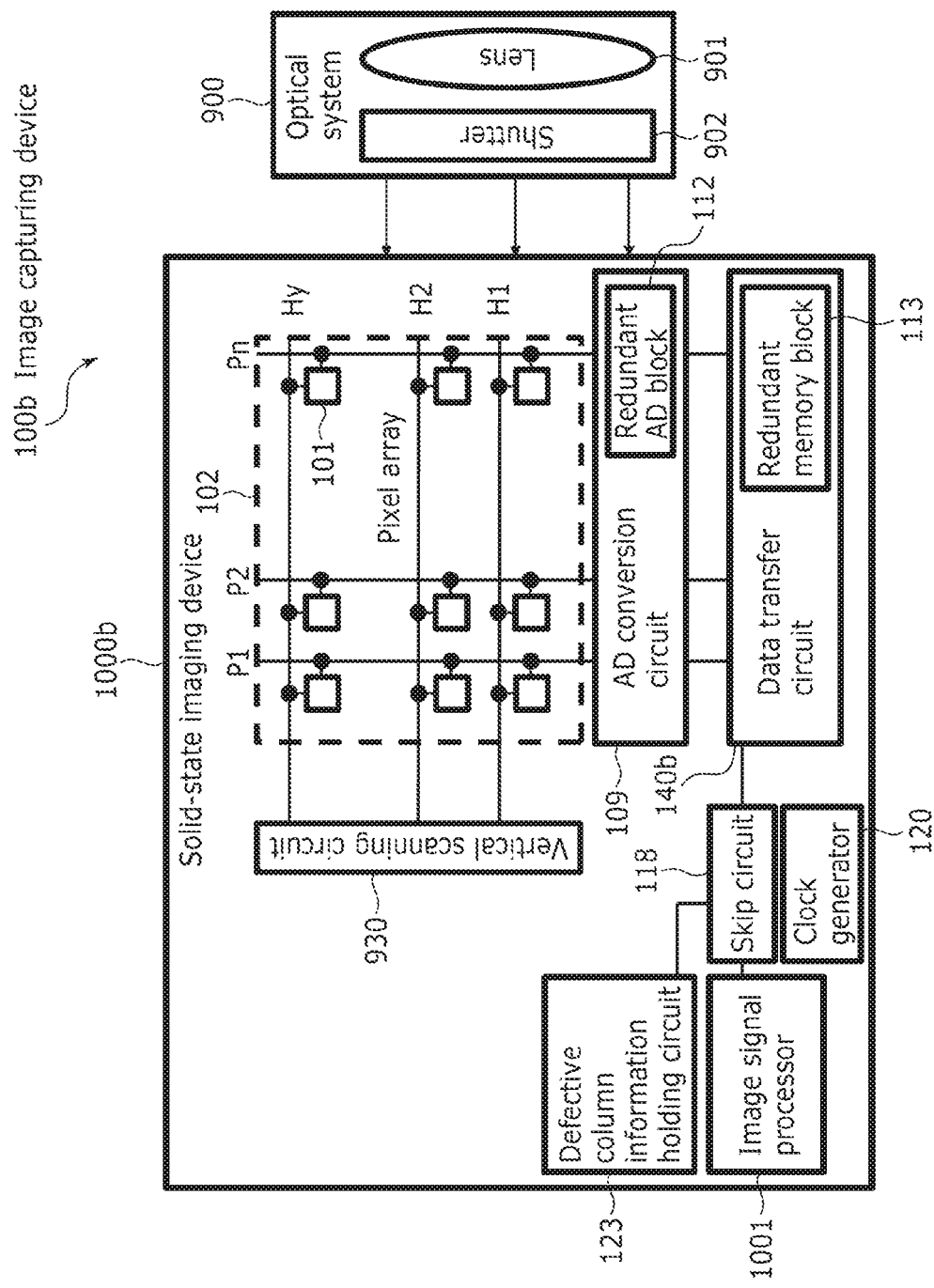
FIG. 9 is a block diagram illustrating an example of the configuration of an image capturing device according to Embodiment 2.

The following describes, with reference to the drawings, the configuration and operations of a solid-state imaging device according to Embodiment 2 focusing on the differences from Embodiment 1. FIG. 9 is a block diagram illustrating an example of the configuration of image capturing device 100b according to Embodiment 2. As illustrated in the diagram, image capturing device 100b is a camera or a camera module, for example, and includes optical system 900 and solid-state imaging device 1000b.

Optical system 900 includes lens 901 and mechanical shutter 902. Lens 901 focuses light (e.g., visible light) from an object to form an image on pixel array 102 of solid-state imaging device 1000b. Mechanical shutter 902 is disposed in an optical path between lens 901 and solid-state imaging device 1000b, and controls an amount of light guided onto pixel array 102.

Solid-state imaging device 1000b includes pixel array 102, vertical scanning circuit 930, AD conversion circuit 109, data transfer circuit 140b, clock generator 120, skip circuit 118, defective column information holding circuit 123, and image signal processor 1001.

Image signal processor 1001 carries out various types of signal processing (image processing) on digital output data OUTPUT which has been output by data transfer circuit 140b.

Vertical scanning circuit 930 scans a plurality of pixel circuits 101, on a row-by-row basis, in order to read out signals from pixel circuits 101 on a row-by-row basis.

Pixel array 102 includes the plurality of pixel circuits 101 arranged in rows and columns. Here, pixel circuit 101 is provided with a light receiver including a photoelectric conversion element that carries out photoelectric conversion. The photoelectric conversion element is, for example, a light-sensitive element such as a photodiode or a photogate, a photoelectric conversion film including amorphous silicon, or an organic photoelectric conversion film. Pixel circuit 101 further includes a device for reading out a signal produced through photoelectric conversion and a device for carrying out an initialization operation, as necessary.

Clock generator 120 generates clock signals (reference clock signals) and supplies clock signals different from each other respectively to: binary counter 104 and column AD conversion circuit 106 included in AD conversion circuit 109; data transfer circuit 140b; vertical scanning circuit 930; skip circuit 118; and defective column information holding circuit 123.

AD conversion circuit 109 includes redundant AD block 112, and data transfer circuit 140b includes redundant memory block 113.

From data transfer circuit 140b, j-bit AD conversion values for m columns are sequentially output for every readout cycle. Skip circuit 118 includes a circuit that performs data thinning, in units of j bits×m columns, for AD conversion values output from data transfer circuit 140b, and the skip circuit performs data thinning for AD conversion values of a defect column based on information of defective column information holding circuit 123.

Defective column information holding circuit 123 is, for example, a circuit for writing information about a defect column onto a non-volatile memory when a defect has been detected in the AD conversion circuit or the data transfer circuit in pre-shipment inspection.

It should be noted that the details of the method of the pre-shipment inspection and writing onto the non-volatile memory will be omitted.

Figure 10:
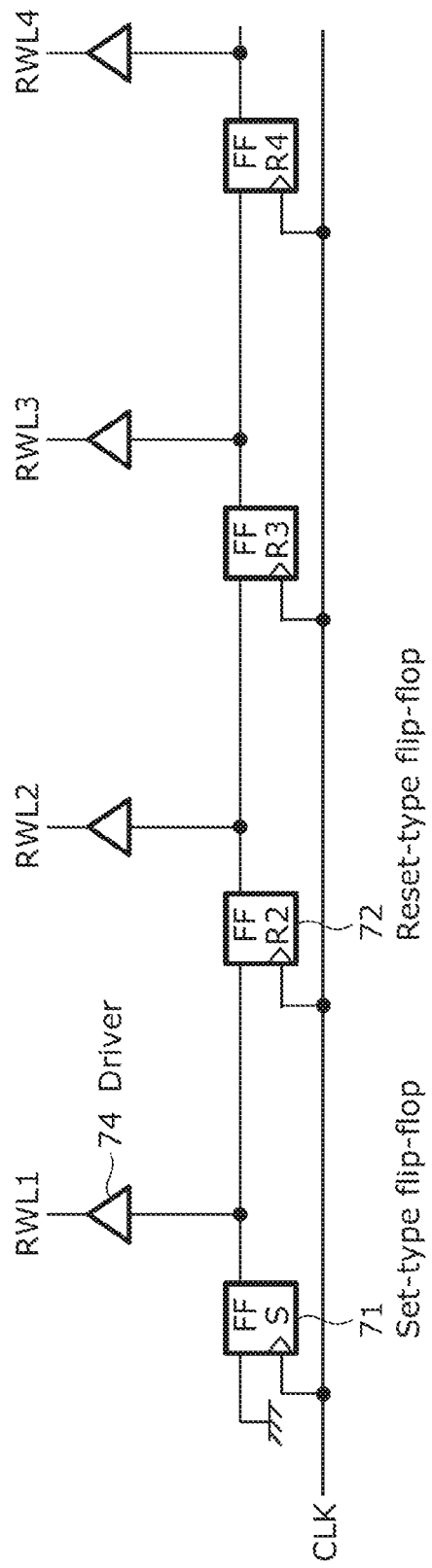
FIG. 10 is a diagram illustrating a detailed configuration of a horizontal scanning circuit according to Embodiment 2.
Figure 11:
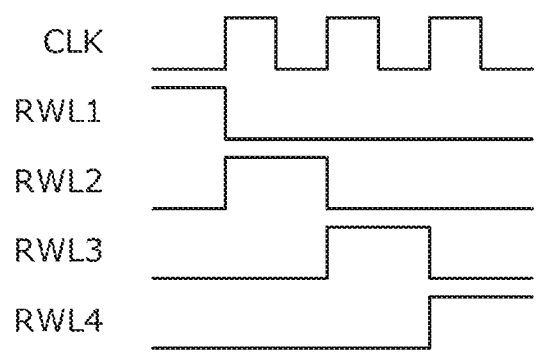
FIG. 11 is a diagram illustrating the drive waveforms of readout signals RWL 1 to RWL 4 supplied to a memory section according to Embodiment 2.

FIG. 10 is a diagram illustrating an example of the detailed configuration of horizontal scanning circuit 7 according to Embodiment 2 of the present disclosure. FIG. 11 is a diagram illustrating the drive waveforms of readout signals RWL 1 to RWL 4 supplied to the memory section according to Embodiment 2. In FIG. 11, the drive waveforms of readout signals RWL 1 to RWL 4 supplied to the memory sections corresponding to the respective settings 1 to 4.

Horizontal scanning circuit 7 includes set-type flip-flop 71 and reset-type flip-flop 72, and the output of each of the flip-flops activates readout signals RWL 1 to RWL 4 of the memory sections via driver 74.

In the initial state, the output of set-type flip-flop 71 denoted as FFS is at level H (high) and the outputs of reset-type flip-flops 72 denoted as FFR 2 to FFR 4 are at level L (low). Accordingly, only readout signal RWL 1 is activated to level H.

When clock CLK is activated, reset-type flip-flop 72 denoted as FFR 2 corresponding to readout signal RWL 2 takes in data of set-type flip-flop 71 denoted as FFS, and thus readout signal RWL 2 is activated.

Next, when clock CLK is activated, the signal of reset-type flip-flop 72 denoted as FFR 2 corresponding to readout signal RWL 2 is taken in by reset-type flip-flop 72 denoted as FFR 3 corresponding to readout signal RWL 3, and readout signal RWL 3 is activated.

Next, when clock CLK is activated, the signal of reset-type flip-flop 72 denoted as FFR 3 corresponding to readout signal RWL 3 is taken in by reset-type flip-flop 72 denoted as FFR 4 corresponding to readout signal RWL 4, and readout signal RWL 4 is activated.

In this way, readout signals RWL 1 to RWL 4 are activated sequentially.

In other words, the activation of readout signals RWL 1 to RWL 4 is carried out without any change in the order of reading out of the memory sections between the case where redundancy relief is not performed and the case where redundancy relief is performed for any of the blocks.

In Embodiment 1, the circuit that skips the memory for the block on which redundancy relief has been performed is controlled using, for example, logic circuit 73 and select signal 7116. In this case, horizontal scanning circuit 7 is caused to operate to read out all of the memory blocks including redundant memory block 113 in both cases where redundancy relief is performed and where redundancy relief is not performed.

On the other hand, skip circuit 118 is disposed between data transfer circuit 140b, which includes horizontal scanning circuit 7, and image signal processor 1001, thereby deleting data including a defective block and performing reading out. Accordingly, the processing of image signal processor 1001 is identical between the case where redundancy relief is not performed and the case where redundancy relief is performed.

Skip circuit 118 skips the AD conversion value corresponding to a defective column and performs reading out, according to the information from defective column information holding circuit 123 in which the information about the defective column that has occurred in AD conversion circuit 109 or data transfer circuit 140b.

FIG. 12 is an explanatory diagram illustrating the correspondence between readout cycles and the columns of each of the column AD conversion circuits corresponding to data output from the data transfer circuit, according to Embodiment 2. In addition, FIG. 14 is a diagram illustrating the order of outputs of the skip circuit in the readout cycle according to Embodiment 2.

Figure 14:
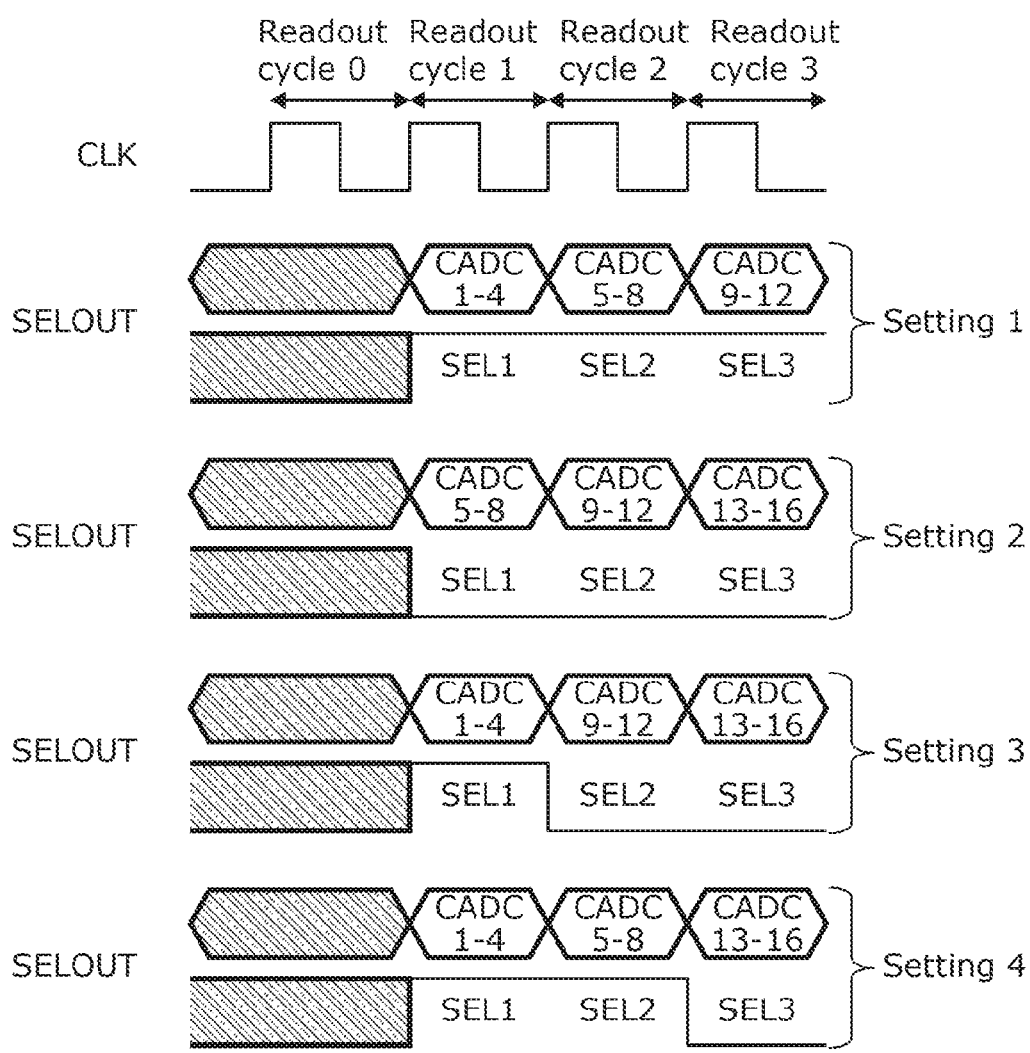
FIG. 14 is a diagram illustrating the order of outputs of the skip circuit in the readout cycle according to Embodiment 2.

FIG. 12 and FIG. 14 illustrate the settings of skip circuit 118 and the state of each column of the column AD conversion circuit that performs output to image signal processor 1001, each of which indicates the relationship between readout cycles and outputs for the case where redundancy relief is not performed (setting 1), the case where there is a defect in column AD conversion circuit 106 in any of the first to fourth columns or memory section 5 in any of the first to fourth columns (setting 2), the case where there is a defect in column AD conversion circuit 106 in any of the fifth to eighth columns or memory section 5 in any of the fifth to eighth columns (setting 3), and the case where there is a defect in column AD conversion circuit 106 in any of the ninth to twelfth columns or memory section 5 in any of the ninth to twelfth columns (setting 4). At this time, the connection state of pixel signal line 11 and column AD conversion circuit 106 is assumed to be the same as the connection state of Embodiment 1.

In this case, on appearance, in each of the settings, AD conversion values obtained through pixel signal lines 11 denoted as P1 to P4 in readout cycle 1, pixel signal lines 11 denoted as P5 to P8 in readout cycle 2, and pixel signal lines 11 denoted as P9 to P12 in readout cycle 3 are sequentially read out. In other words, in any of settings 2 to 4, reading out is performed with the data of a defective column being thinned out, in readout cycles 1 to 3.

Figure 13:
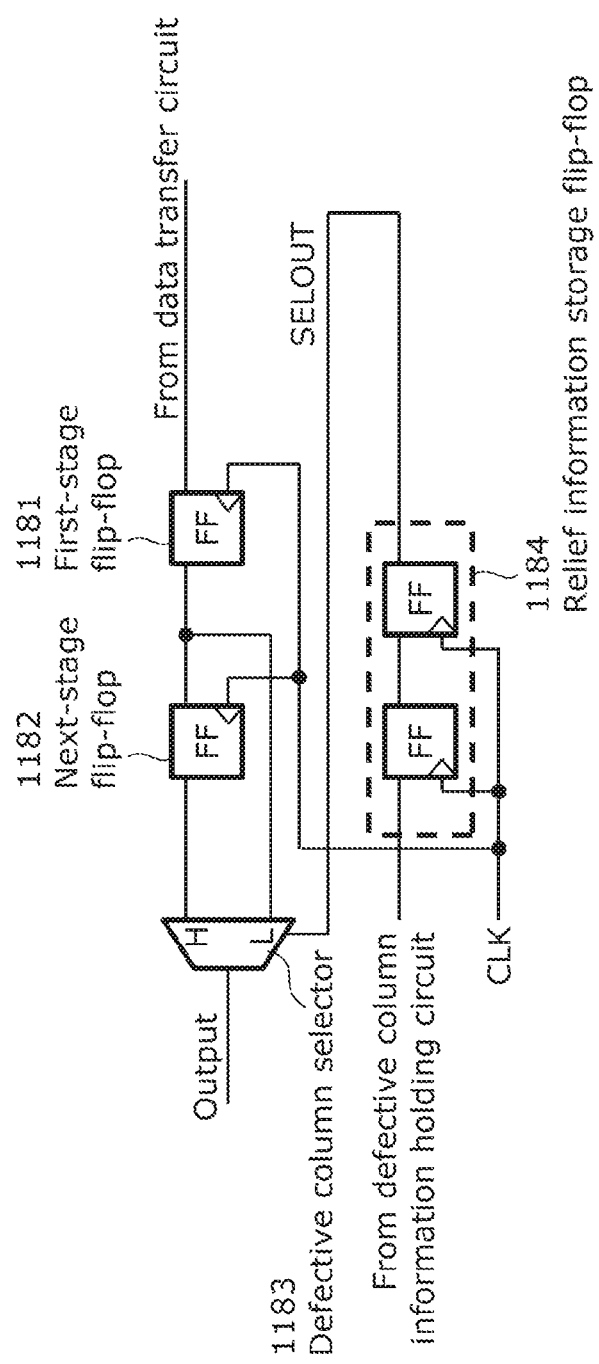
FIG. 13 is a diagram illustrating the detailed configuration of a skip circuit according to Embodiment 2.

FIG. 13 is a diagram illustrating an example of the detailed configuration of a skip circuit according to Embodiment 2.

Values of the column AD conversion circuit sequentially output from the data transfer circuit are taken in and output by clock CLK to first-stage flip-flop 1181, and further, values of the column AD conversion circuit output from first-stage flip-flop 1181 are taken in and output by next-stage flip-flop 1182.

Defective column selector 1183 is a selector that selects one of an output of first-stage flip-flop 1181 or an output of next-stage flip-flop 1182, and select signal SELOUT is determined by relief information storage flip-flop 1184.

Relief information storage flip-flop 1184 includes a shift register with flip-flops in a cascade connection. For example, relief information storage flip-flop 1184 outputs the settings of SEL 1 to SEL 3 from defective column information holding circuit 123. As a result, SEL 1, SEL 2, and SEL 3 are sequentially set in synchronization with clock CLK in accordance with the timing when data is output from CADC 1 to 4 of AD conversion circuit 109 to next-stage flip-flop 1182.

As described above, horizontal scanning circuit 7 scans a total of (k+m) memory sections 5 sequentially. In addition, skip circuit 118 excludes or discards the AD conversion values of m memories corresponding to the m column conversion circuits including column AD conversion circuit 106 that is defective, among the AD conversion values from the scanned (k+m) memory sections 5, and outputs the AD conversion values of k memory sections 5 corresponding to the k column AD conversion circuits that have not been excluded.

In Embodiment 1, logic circuit 73 and select signal 7116 are provided to all of the readout signals in the data transfer circuit, which causes an area penalty. In general, data transfer circuit 140 has a configuration of being long in the horizontal direction, and an increase in area in the vertical direction causes a large area penalty. By using the skip circuit, it is possible to reduce the area of the solid-state imaging device by including, outside the data transfer circuit, a logic circuit to delete data for a defective block when redundancy relief is performed.

As described above, solid-state imaging device 1000b according to Embodiment 2 includes k memory sections 5 that store k AD conversion values output from the k column AD conversion circuits; m memory sections 5 that store m AD conversion values output from the m column AD conversion circuits, m memory sections being provided redundantly; a horizontal scanning circuit that scans k memory sections 5 and m memory sections 5; and skip circuit 118 that discards, from among AD conversion values from k memory sections 5 and m memory sections 5 that have been scanned, AD conversion values from m memories corresponding to m column conversion circuits that have been excluded, and outputs AD conversion values from k memories corresponding to the k column AD conversion circuits that have not been excluded.

According to the above-described configuration, there is no change in, on appearance, the output operation (for example, the order of output and output timing) for AD conversion values that are output by horizontal scanning between the case where redundancy relief is performed and the case where redundancy relief is not performed, and it is not necessary to change, depending on the presence or absence of a defect, the operation of the circuit that receives and processes the AD conversion values that have been output.

Here, the horizontal scanning circuit may cause the m memories to output m AD conversion values by performing scanning in a unit of m memories.

According to the above-described configuration, even when the redundancy relief is performed, the periodic correction process for periodic noise is not disturbed because the periodicity of the repetition of the circuits involved in the generation of periodic noise can be maintained.

Embodiment 3

Figure 15:
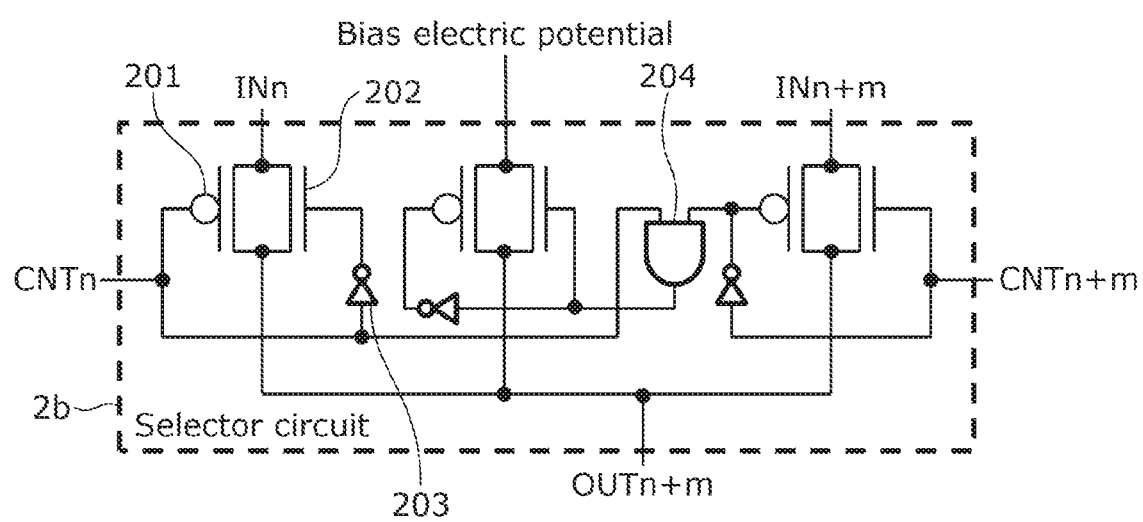
FIG. 15 is a diagram illustrating an example of the circuit configuration of a selector circuit according to Embodiment 3.

FIG. 15 is a diagram illustrating an example of the circuit configuration of selector circuit 2b. Selector circuit 2b includes P-channel MOS transistor 201, N-channel MOS transistor 202, and inverter 203. Selector circuit 2b includes an additional input compared to selector circuit 2 illustrated in FIG. 5.

INn is an input connected to the nth pixel, INn+m is an input connected to the n+mth pixel, and selector circuit 2b is controlled with control signal CNTn and control signal CNTn+m to switch between three states; that is, the state in which INn and OUTn+m are connected to conduct, the state in which INn+m and OUTn+m are connected to conduct, and the state in which OUTn+m is conducted to bias electric potential.

For example, INn+m and OUTn+m are in a conducting state when electric potential H (high) is input to CNTn and electric potential H is input to CNTn+m; INn and OUTn+m are in a conducting state when electric potential L (low) is input to CNTn and electric potential L is input to CNTn+m; and a bias electric potential is output to OUTn+m when electric potential H is input to CNTn and electric potential L is input to CNTn+m.

Figure 16:
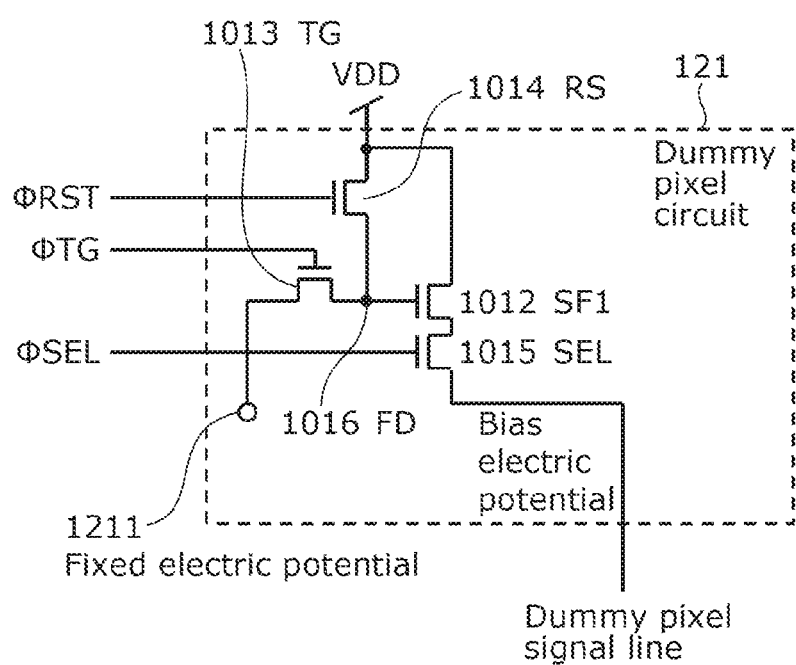
FIG. 16 is a diagram illustrating in detail a dummy pixel according to Embodiment 3.

FIG. 16 is a diagram illustrating in detail dummy pixel circuit 121 as a source of supply of bias electric potential, for example.

The source of supply of the bias electric potential can be an input from a general bias circuit.

Dummy pixel circuit 121 has a configuration in which fixed electric potential 1211 is applied to light receiver 1011 of the pixel circuit illustrated in FIG. 2, and otherwise has the same configuration as the pixel circuit illustrated in FIG. 2. By setting the light receiver to fixed electric potential 1211, the electric potential of the dummy pixel signal line can be output arbitrarily by activating SEL 1015 and TG.

This allows the input of column AD conversion circuit 106 that performs redundancy relief to be fixed at an arbitrary electric potential, and thus, for example, it is possible to reduce the power of column AD conversion circuit 106 corresponding to a defective column by fixing the circuit in column AD conversion circuit 106 to an input state with low power. As a result, it is possible to reduce consumption current.

In addition, since it is possible to fix the circuit in column AD conversion circuit 106 to an average power input state, the power difference between a defective column and a non-defective column can be reduced, thereby making it possible to keep the difference in the sudden power distribution in the column direction low, and to suppress the column-based noise caused by the power difference between the columns.

As described above, in solid-state imaging device 1000 according to Embodiment 3, each of the at least (k−m) selector circuit 2s further receives, as an input, a bias voltage, and selectively outputs one of the first pixel signal corresponding to the nth column, the second pixel signal corresponding to the (n+m) column, or the bias voltage.

According to the above-described configuration, when the bias voltage is set to, for example, a voltage such that the counting operation of column AD conversion circuit 106 stops immediately, the power consumption of m column AD conversion circuits 106 including column AD conversion circuit 106 that is defective can be reduced or set to a desired value.

Embodiment 4

Figure 17:
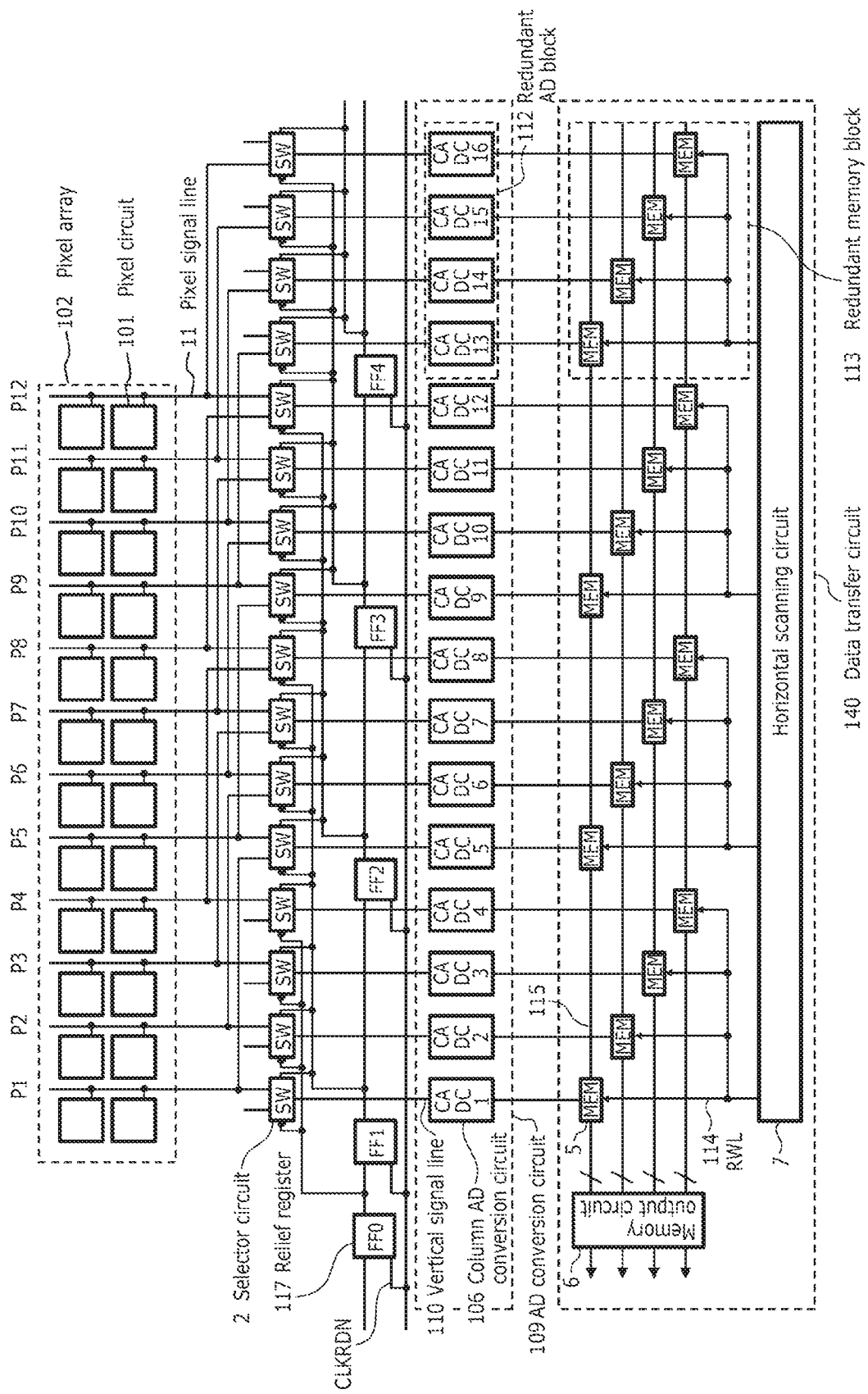
FIG. 17 is a diagram illustrating in detail configurations of a column AD conversion circuit and memory sections according to Embodiment 4.

FIG. 17 is a diagram illustrating in detail configurations of a column AD conversion circuit and memory sections according to Embodiment 4. According to the present embodiment, select signals SEL 1 to SEL 4 are used to specify the block on which redundancy relief is to be carried out. However, the block on which redundancy relief is to be carried out may be specified by relief register 117 provided for each block, as illustrated in FIG. 17. The outputs of a plurality of relief registers 117 are connected to the inputs of control signals CNTn and CNTn+m of selector circuit 2.

Relief register 117 includes flip-flops in a cascade connection, and the relief block can be specified by the data written onto each relief register 117. Relief register 117 is configured to perform shift input sequentially by clock signal CLKRDN.

Relief register 117 is set based on the data of defective column information holding circuit 123 which holds the information about the defective column. Here, the method of setting to each relief register 117 is omitted.

FIG. 18 is an explanatory diagram illustrating the output level of relief register 117 and the connection state of pixel signal lines P1 to P12 and column AD conversion circuit 106.

Setting 1 indicates the state in which P1 is connected to column AD conversion circuit 106 denoted as CADC 1, and in the same manner, column AD conversion circuits 106 denoted as CADC 2 to CADC 12 are connected to pixel signal lines 11 corresponding to P2 to P12.

Setting 2 is a setting that assumes the case where a failure has occurred in one or more of column AD conversion circuits 106 denoted as CADC 1 to CADC 4, or a failure has occurred in one or more of memory sections 5 connected to the one or more of column AD conversion circuits 106 denoted as CADC 1 to CADC 4.

Setting 3 is a setting that assumes the case where a failure has occurred in one or more of column AD conversion circuits 106 denoted as CADC 5 to CADC 8, or a failure has occurred in one or more of memory sections 5 connected to the one or more of column AD conversion circuits 106 denoted as CADC 5 to CADC 8.

Setting 4 is a setting that assumes the case where a failure has occurred in one or more of column AD conversion circuits 106 denoted as CADC 9 to CADC 12, or a failure has occurred in one or more of memory sections 5 connected to the one or more of column AD conversion circuits 106 denoted as CADC 9 to CADC 12.

As described above, relief register 117 is a shift register including a flip-flop provided for each of a total of m selectors. Each of the flip-flops controls selecting of a corresponding one of the m selectors.

The output signals of the shift registers are set equivalent to settings 1 to 4 controlled by select signals SEL 1 to SEL 4 indicated in the above-described Embodiment 1, and the same operation is performed.

In this manner, relief register 117 can be used to set control signals CNTn and CNTn+m for each selector circuit 2.

When a total number of pixel columns arranged in the solid-state imaging device is large, a total number of lines for the select signals increases, and the wiring area in the solid-state imaging device increases. Accordingly, with this configuration, it is possible to reduce the wiring resources for control signals CNTn and CNTn+m of selector circuit 2 and inhibits the increase in area.

Figure 19A:
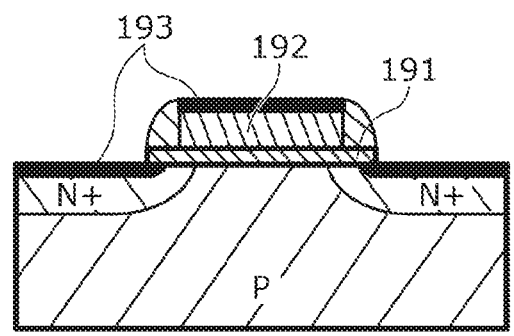
FIG. 19A illustrates an example of the cross-sectional configuration of a transistor included in the relief register and selector according to Embodiment 4.
Figure 19B:
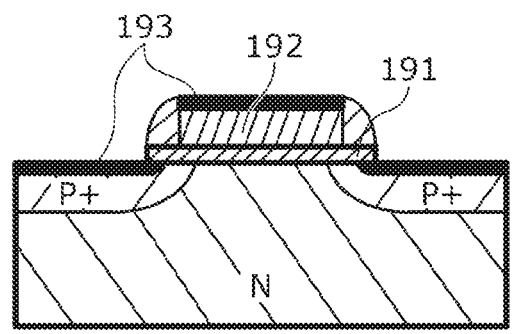
FIG. 19B illustrates an example of the cross-sectional configuration of a transistor included in the relief register and selector according to Embodiment 4.

FIG. 19A and FIG. 19B illustrate examples of the cross-sectional configuration of a transistor included in the relief register and selector according to Embodiment 4. FIG. 19A illustrates an N-channel MOS transistor. The N-channel MOS transistor includes two N+ regions in a P-type well of a semiconductor substrate. The two N+ regions are the source and the drain region. The surface of the semiconductor substrate includes gate oxide film 191, polysilicon 192 which is the gate, and silicide 193 which enhances the conductivity to the N+ region. FIG. 19B illustrates a P-channel MOS transistor. The P-channel MOS transistor includes two P+ regions in an N-type well of a semiconductor substrate. The two P+ regions are the source region and the drain region. The surface of the semiconductor substrate includes gate oxide film 191, polysilicon 192 which is the gate, and silicide 193 which enhances the conductivity to the P+ region. The thickness of gate oxide film 191 of the transistors included in relief register 117 is the same as the thickness of gate oxide film 191 of the transistors included in selector circuit 2.

This is due to the following reasons. Pixel signal line 11 generally has an amplitude of 2 V or more, which is higher than the supply voltage as handled by memory section 5. Therefore, selector circuit 2 which is connected to pixel signal line 11 uses a high-withstand-voltage transistor with a large film thickness instead of a transistor with a small film thickness (i.e., gate oxide film) applied in memory section 5 and general logic circuits. In addition, since the circuit physically close to selector circuit 2 of the column AD conversion circuit also has a high power supply voltage and uses a high-withstand-voltage transistor as with selector circuit 2, the power supply used for relief register 117 supplies a higher power supply voltage than memory section 5 or the logic circuits to enable sharing of the power supply line. In other words, the area of the solid-state imaging device can be minimized by configuring relief register 117 with a transistor of the same thickness as selector circuit 2 that supports high voltages.

As described above, solid-state imaging device 1000 according to Embodiment 3 further includes a relief register that stores defect information indicating the m column AD conversion circuits including a column AD conversion circuit that is defective among the k column AD conversion circuits and the m column AD conversion circuits, as the m column AD conversion circuits that are selectively excluded, and in solid-state imaging device 1000, the plurality of selector circuits 2 perform selecting based on the defect information.

According to the above-described configuration, column AD conversion circuit 106 that is defective can be relieved by setting the defect information into the relief register as part of the initialization processing at the time of activation and reset of solid-state imaging device 1000.

Here, the relief register may be a shift register including a flip-flop provided for every m selector circuits 2 included in the plurality of selector circuits 2, and the flip-flop may control selecting of corresponding m selector circuits 2.

According to the above-described configuration, the total number of control signals connected to each selector circuit 2 can be reduced compared to the case where a shift register is not provided, and the circuit area can be downsized because the total number of lines for the control signals is reduced.

Here, the relief register may include a transistor including a gate oxide film having a thickness same as a thickness of a gate oxide film of a transistor included in each of the plurality of selector circuits 2.

According to the above-described configuration, relief register 117 can share the same breakdown voltage and the same power supply line as selector circuit 2. In addition, when selector circuit 2 includes a high-withstand-voltage transistor with a large film thickness instead of a transistor with a small film thickness applied in memory section 5 or general logic circuits, the area of the solid-state imaging device can be reduced by configuring relief register 117 with a transistor of the same film thickness as selector circuit 2 that supports high voltages.

Although the solid-state image device according to one or more aspects of the present disclosure has been described above based on the embodiments, the present disclosure is not limited to the above-described embodiments. Other forms in which various modifications apparent to those skilled in the art are applied to the embodiments, or forms structured by combining structural components of different embodiments may be included within the scope of one or more aspects of the present disclosure, unless such changes and modifications depart from the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure relates to a solid-state imaging device, and an imaging apparatus or a distance-measuring imaging device including the solid-state imaging device as an image capturing device, and is suitable, for example, for a video camera, a digital camera, a distance-measuring system, etc.

The invention claimed is:

1. A solid-state imaging device comprising:
   a plurality of pixel circuits arranged in rows and columns;
   a plurality of selectors that each receive, as inputs, two pixel signals corresponding to two columns different from each other;
   k column AD conversion circuits that perform AD conversion on pixel signals output from the plurality of selectors, k being an integer greater than or equal to two; and
   m column AD conversion circuits that are provided redundantly, m being an integer greater than or equal to two, wherein
   the plurality of selectors selectively exclude, from among the k column AD conversion circuits and the m column AD conversion circuits, m column AD conversion circuits corresponding to m columns adjacent to each other, and associate k pixel signals output from the plurality of pixel circuits with k column AD conversion circuits which have not been excluded.

2. The solid-state imaging device according to claim 1, wherein
   the plurality of selectors shift some or all of the k pixel signals by m columns in a column alignment direction, to selectively exclude the m column AD conversion circuits corresponding to the m columns used for shifting.

3. The solid-state imaging device according to claim 1, wherein
   the plurality of selectors include at least (k−m) selectors, and
   each of the at least (k−m) selectors receives, as inputs, a first pixel signal corresponding to an nth column and a second pixel signal corresponding to an (n+m)th column, and selectively outputs one of the first pixel signal or the second pixel signal that have been received to a corresponding column AD conversion circuit among the k column AD conversion circuits and the m column AD conversion circuits, n being an integer from m+1 to k.

4. The solid-state imaging device according to claim 1, further comprising:
   k memories that store k AD conversion values output from the k column AD conversion circuits;
   m memories that store m AD conversion values output from the m column AD conversion circuits, the m memories being provided redundantly; and
   a horizontal scanning circuit that excludes, from scanning, m memories corresponding to m column AD conversion circuits that have been excluded, from among the k memories and the m memories, and scans k memories corresponding to the k column AD conversion circuits that have not been excluded.

5. The solid-state imaging device according to claim 1, further comprising:
   k memories that store k AD conversion values output from the k column AD conversion circuits;
   m memories that store m AD conversion values output from the m column AD conversion circuits, the m memories being provided redundantly;
   a horizontal scanning circuit that scans the k memories and the m memories; and
   a skip circuit that discards, from among AD conversion values from the k memories and the m memories that have been scanned, AD conversion values from m memories corresponding to m column AD conversion circuits that have been excluded, and outputs AD conversion values from k memories corresponding to the k column AD conversion circuits that have not been excluded.

6. The solid-state imaging device according to claim 4, wherein
   the horizontal scanning circuit causes the m memories to output m AD conversion values by performing scanning in a unit of m memories.

7. The solid-state imaging device according to claim 3, wherein
   each of the at least (k−m) selectors further receives, as an input, a bias voltage, and selectively outputs one of the first pixel signal corresponding to the nth column, the second pixel signal corresponding to the (n+m) column, or the bias voltage.

8. The solid-state imaging device according to claim 1, further comprising:
   a relief register that stores defect information indicating the m column AD conversion circuits including a column AD conversion circuit that is defective among the k column AD conversion circuits and the m column AD conversion circuits, as the m column AD conversion circuits that are selectively excluded, wherein
the plurality of selectors perform selecting based on the defect information.

9. The solid-state imaging device according to claim 8, wherein
the relief register is a shift register including a flip-flop provided for every m selectors included in the plurality of selectors, and
the flip-flop controls selecting of corresponding m selectors.

10. The solid-state imaging device according to claim 8, wherein
the relief register includes a transistor including a gate oxide film having a thickness same as a thickness of a gate oxide film of a transistor included in each of the plurality of selectors.

* * * * *